(12) United States Patent
Telford

(10) Patent No.: US 7,771,263 B2
(45) Date of Patent: Aug. 10, 2010

(54) PORTABLE SWING SPEED ANALYZER

(75) Inventor: Kenneth N. Telford, Huntington Beach, CA (US)

(73) Assignee: Telford Golf Enterprises, LLC, Huntington Beach, CA (US)

( * ) Notice: Subject to any disclaimer, the term of this patent is extended or adjusted under 35 U.S.C. 154(b) by 1572 days.

(21) Appl. No.: 10/938,970

(22) Filed: Sep. 9, 2004

(65) Prior Publication Data

US 2006/0052173 A1    Mar. 9, 2006

(51) Int. Cl.
| | |
|---|---|
| A63F 9/24 | (2006.01) |
| A63F 13/00 | (2006.01) |
| A63B 67/02 | (2006.01) |
| G06F 17/00 | (2006.01) |
| G06F 19/00 | (2006.01) |

(52) U.S. Cl. .................................. 463/3; 473/151
(58) Field of Classification Search .................. 463/3; 473/310, 321, 131; 273/108.2, 245, 277, 273/298, 317.2

See application file for complete search history.

(56) References Cited

U.S. PATENT DOCUMENTS

| | | | | |
|---|---|---|---|---|
| 4,660,832 A | * | 4/1987 | Shomo | 16/431 |
| 5,277,423 A | * | 1/1994 | Artus | 473/319 |
| 5,277,428 A | * | 1/1994 | Goodwin et al. | 473/224 |
| 5,441,256 A | | 8/1995 | Hackman | |
| 5,688,183 A | * | 11/1997 | Sabatino et al. | 473/212 |
| 5,797,806 A | * | 8/1998 | Butler | 473/310 |
| 6,045,364 A | * | 4/2000 | Dugan et al. | 434/252 |
| 6,224,493 B1 | * | 5/2001 | Lee et al. | 473/223 |
| 6,441,745 B1 | * | 8/2002 | Gates | 340/669 |
| 6,607,450 B1 | * | 8/2003 | Hackman | 473/223 |
| 6,649,905 B2 | * | 11/2003 | Grenlund | 250/227.14 |
| 6,991,552 B2 | * | 1/2006 | Burke | 473/213 |
| 2006/0084516 A1 | * | 4/2006 | Eyestone et al. | 473/219 |

OTHER PUBLICATIONS

Patent-Office-Swingrevolution video link to a YouTube video illustrating device disclosed in U.S. Appl. No. 10/938,970, Video last visited Mar. 30, 2010, link: http://www.youtube.com/watch?v=3k4koYO1gZo.

* cited by examiner

*Primary Examiner*—Dmitry Suhol
*Assistant Examiner*—Reginald A Renwick
(74) *Attorney, Agent, or Firm*—Novatech IP Law

(57) ABSTRACT

Provided is a swing speed analyzer for mounting on a swinging implement and comprising a first accelerometer, a processor and a shock attenuator. The processor uses an output from the first accelerometer to compute a swing speed of the swinging implement. The shock attenuator is comprised of a material that is sized and dimensioned to dampen an impact shock wave by more than 50% at 125 Hz. The material is preferably sized and dimensioned to dampen the impact shock wave from more than 1000 g to less than 500 g. Suitable attenuators can include viscoelastomeric materials such as foam. The swing speed analyzer can advantageously include any of a releasable attachment mechanism, a liquid crystal or other visual display, a second accelerometer, and a strain gauge. The analyzer can advantageously be attached to a golf club, a tennis racket, a baseball bat, or a hockey stick.

14 Claims, 13 Drawing Sheets

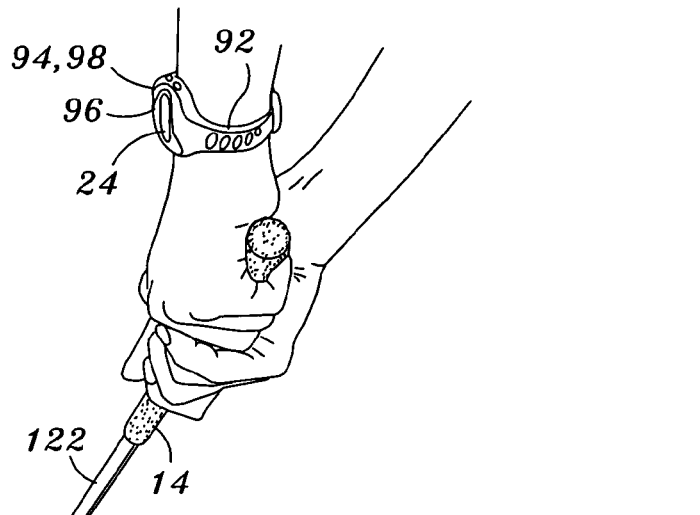
FIG. 1
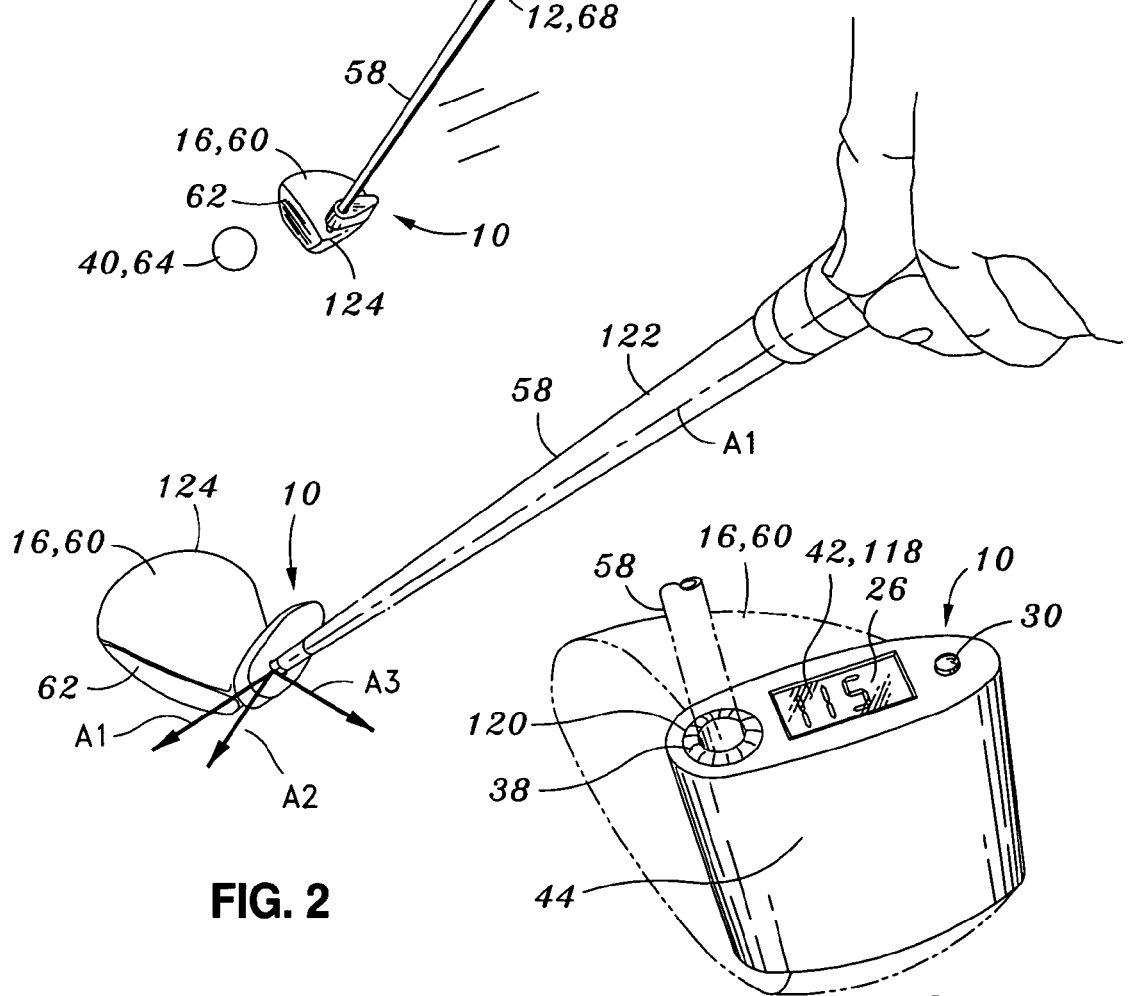
FIG. 2
FIG. 2a

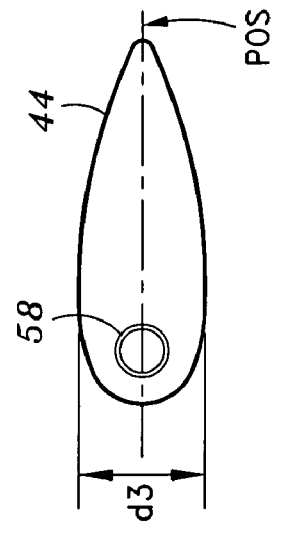
FIG. 13a
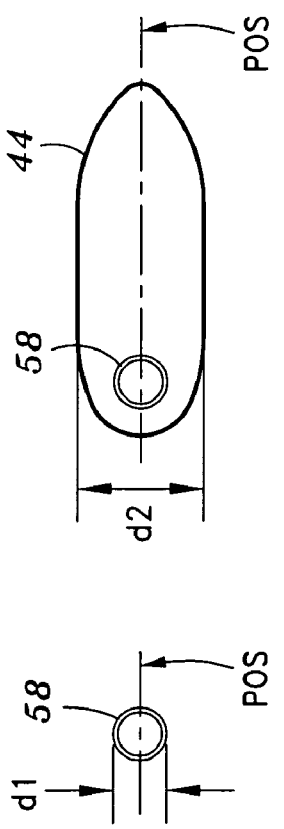
FIG. 13b
FIG. 13c
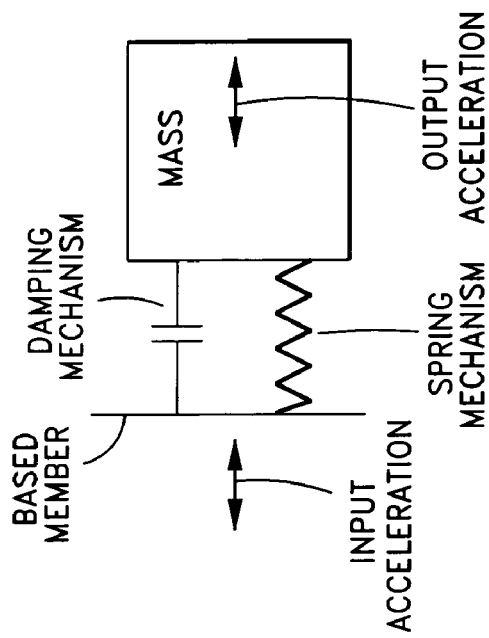
FIG. 14b
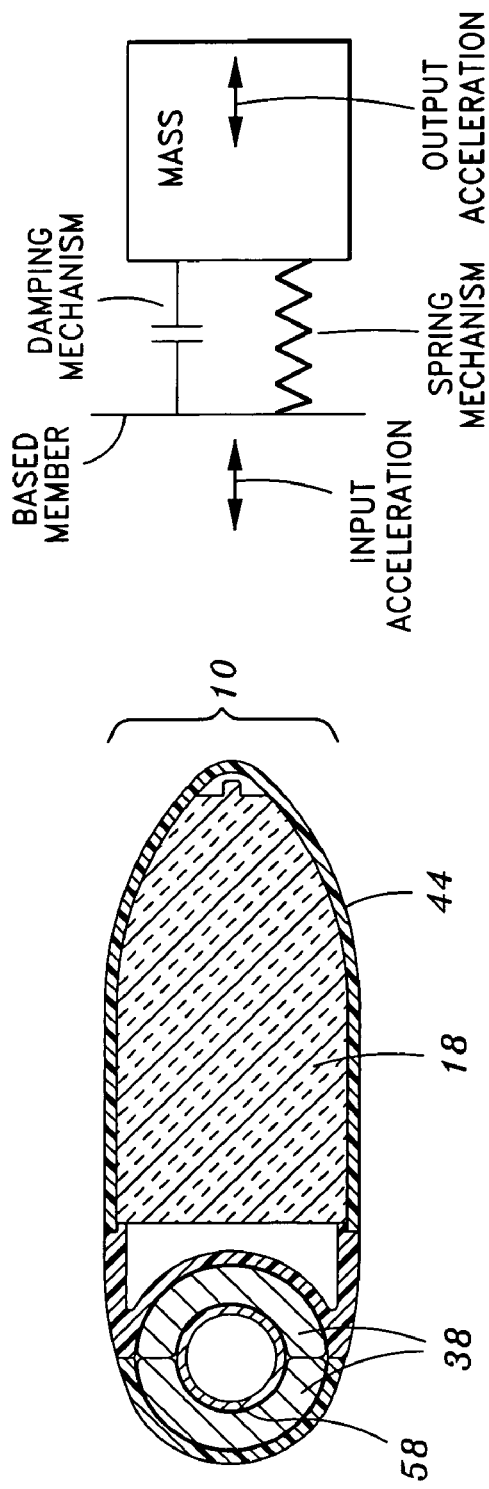
FIG. 14a

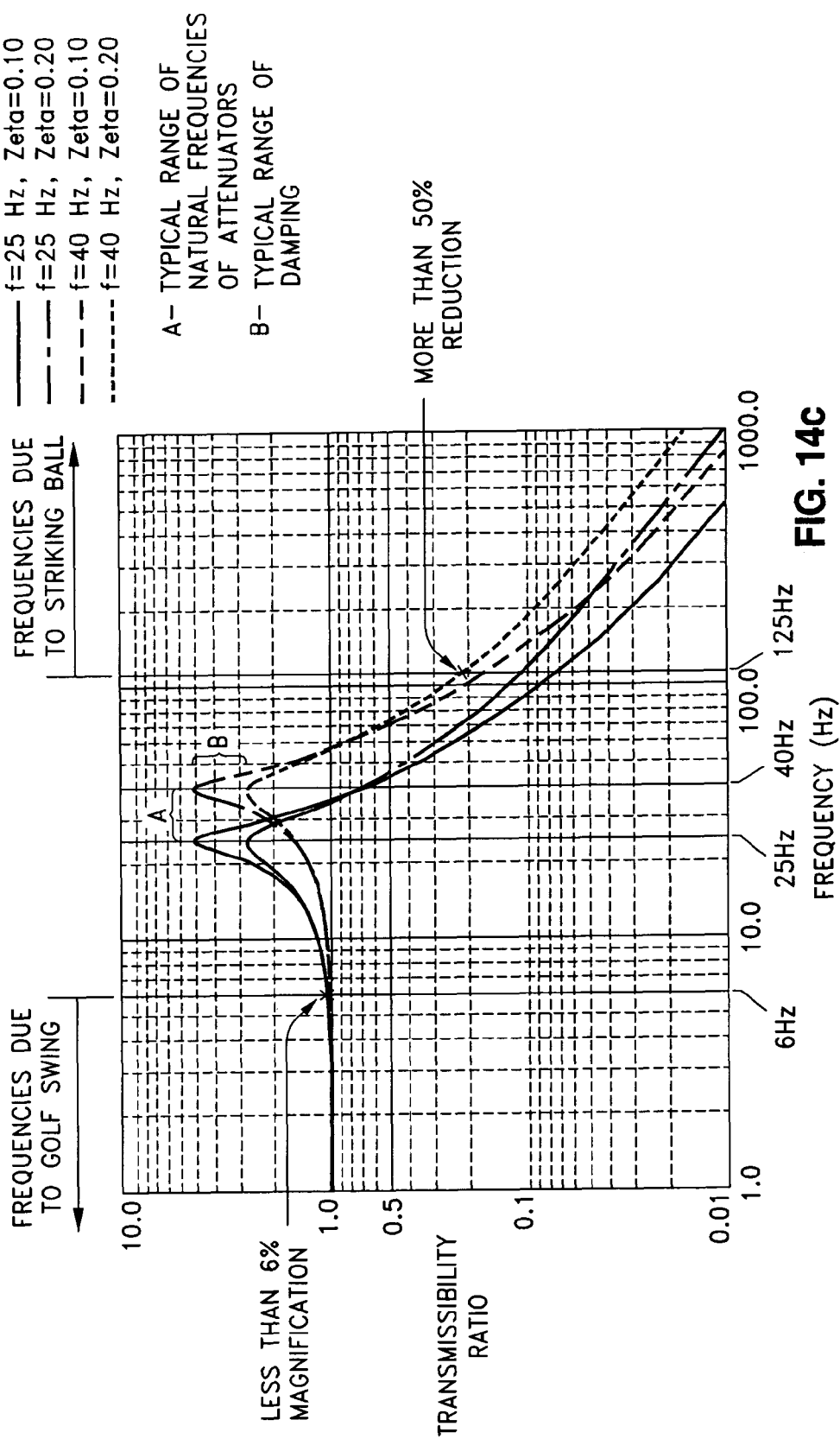

PORTABLE SWING SPEED ANALYZER

CROSS-REFERENCE TO RELATED APPLICATIONS (NOT APPLICABLE)

STATEMENT RE: FEDERALLY SPONSORED RESEARCH/DEVELOPMENT (NOT APPLICABLE)

BACKGROUND OF THE INVENTION

The present invention generally relates to sporting equipment and, more particularly, to a portable swing speed analyzer that is specifically adapted to be releasably mounted on a hand-held sporting implement such as a golf club. The swing speed analyzer is configured to measure swing parameters such as velocity during impact with an object such as a golf ball and to display the swing parameters on a display device. The swing speed analyzer may be further configured to measure bending in the hand-held sporting implements such as a golf club shaft, during a forward swing in order to determine whether potential energy resulting from bending of a golf club shaft is released at the instant when the golf club strikes the golf ball.

Many sporting activities such as golf, tennis and baseball utilize a swinging implement such as a golf club, a tennis racket, or a baseball bat to strike an object, such as a golf ball, a tennis ball or a baseball. In such activities, it is often desirable to maximize the swinging speed of the swinging implement. Furthermore, it is desirable that the maximized speed of the swinging implement occurs when the swinging implement impacts the object. For the case in which the swinging implement is a golf club, it is desirable that the maximized speed occurs at the instant when the golf club impacts the golf ball.

The prior art includes numerous devices for measuring the swinging speed of swinging implements such as those used in the above-mentioned sporting activities. Such devices may be generally referred to as swing speed analyzers. Prior art swing speed analyzers that are configured to measure the swinging speed of a golf club may be generally classified as one of three types. The first type of swing speed analyzer is comprised of an instrumented mat having embedded sensors. The embedded sensors measure and record the velocity of the club head as well as the angular orientation and direction of travel of a face of the club head during its impact with the golf ball. The second type of swing speed analyzer utilizes a radar device or a radar gun that is placed adjacent to the golf ball. The radar device measures and records the maximum velocity of the club head.

The third type of swing speed analyzer utilizes an instrument that is attached to the shaft of the golf club. The instrument measures the maximum centrifugal acceleration of the golf club and, by calibration, records the maximum speed of the club head. The drawback of the third type of swing speed analyzer is that the accelerometer is not isolated from the very high shock forces when the ball is struck. As a result, the third type of swing speed analyzer is incapable of measuring the maximum speed of the club head when a golf ball is being impacted. Furthermore, this third type of swing speed analyzer is incapable of allowing the user to determine whether the maximum speed of the golf club occurred at impact with the golf ball, as is desired, or whether the maximum speed of the golf club occurred at a less critical point of the swing.

U.S. Pat. No. 4,991,850 issued to Wilhlem (the Wilhlem reference) discloses a swing speed analyzer comprised of accelerometers that are embedded within a wooden head of a golf club. In an alternative embodiment, the accelerometers may be attached to an aft face of a metallic club head of a driver type golf club. In either configuration, the swing speed analyzer of the Wilhlem reference provides a system for measuring the speed of the club head. However, the swing speed analyzer of the Wilhlem reference is not portable due to the inclusion of accelerometers that are embedded within the club head. Furthermore, the swing speed analyzer of the Wilhlem reference fails to isolate the relatively delicate and sensitive accelerometers from very high shock forces on the order of 1000's of g's that occur when the golf club impacts the golf ball.

U.S. Pat. No. 5,688,183 issued to Sabatino (the Sabatino reference) discloses a portable swing speed analyzer comprised of an accelerometer that is attached to a golfer's glove covering the user's hand. The swing speed analyzer of the Sabatino reference is configured to be portable. However, the device suffers from the drawback of having reduced accuracy in measuring the velocity of the club head due to the relatively large spacing between the accelerometer and the club head. The speed of a swinging implement may be characterized by its velocity which may be mathematically expressed by the formula, $v=(a \times r)^{0.5}$, where a is the centrifugal acceleration, v is the tangential velocity, and r is the radius of rotation of the accelerometer. Therefore, by locating the accelerometer adjacent the grip portion of the shaft instead of near the club head, the accuracy of the club head velocity as measured by the accelerometer is reduced by a factor of four. In addition, because the shaft of the golf club typically flexes or bends during the swing, the additional velocity of the club head that occurs due to the release of potential energy when the golf club shaft reflexes from its flexed position cannot be measured by the glove-mounted accelerometer of the Sabatino reference.

U.S. Pat. No. 5,441,256 issued to Hachman (the Hachman reference) describes an accelerometer that is attached to the head of a golf club. As understood, the Hachman reference describes a method of using the accelerometer in order to determine the bending frequency of a shaft of the golf club. A golfer swings the golf club with the accelerometer attached thereto. The same golf club is then placed in a bench-measuring device wherein the golf club is held stationary and the shaft is flexed so that the shaft bending frequency may be measured. The golfer-swung shaft bending frequency is then compared to the bench-measured shaft bending frequency. Ostensibly, the golfer uses the comparison data in order to match the flex of the shaft to the particular golfer's swing. More specifically, the above-described procedure is understood to allow a golfer to perform test swings on a number of different golf club having shafts with varying bending characteristics. Theoretically, the golfer may select a shaft having bending characteristics that match the particular golfer's swing. Once selected, a set of shafts having the desired bending characteristics may be assembled into a customized set of golf clubs that allows the particular golfer to maximize the angular acceleration of each club head of the set during regular play.

However, the Hachman reference suffers from several deficiencies that detract from its overall utility for the following reasons. During the swing of a golf club, a portion of the angular acceleration of the club head results from the rotation of the golf club by the golfer. Another portion of the angular acceleration results from the flex of the golf club shaft during the swing. Unfortunately, during the swing of a golf club, the angular acceleration of the club head due to shaft bending cannot be determined because it is overwhelmed by very high centrifugal and tangential accelerations of the club head. Based upon the above, FIG. 1 of the Hachman reference, which is described as being a graph of the angular acceleration of the club head when swung by the golfer, is believed to be inaccurate because it does not account for that portion of the angular acceleration resulting from rotation of the golf club by the golfer. Furthermore, it should be noted that no mention is made in the Hachman reference regarding using the accelerometer to determine the velocity of the club head.

U.S. Pat. No. 6,441,745 issued to Gates (the Gates reference) describes an acceleration monitor assembly having a circuit board that is releasably mounted on a golf club shaft adjacent to the club head. The circuit board includes a linear accelerometer. The axis of the linear accelerometer is aligned with the axis of the shaft such that the linear accelerometer may measure centrifugal acceleration acting on the golf club during a swing. A wireless transmitter mounted on the circuit board transmits a signal from the linear accelerometer to a remote wireless receiver that may be included in a wrist-mounted device worn by the golfer. The wrist-mounted device displays a velocity reading after the swing. As was mentioned above in the description of the Sabatino reference, the instantaneous velocity of a club head can be calculated from the output of a linear accelerometer using the previously mentioned formula $v=(a\times r)^{0.5}$.

However, as is pointed out in the description of the Gates reference, the radius of rotation of the club head keeps changing during the swing because of rotation of a golfer's shoulders and because of cocking and uncocking of the golfer's elbows and wrists during a swing. As a result, the acceleration monitor assembly of the Gates reference requires the use of an accelerometer calibrator for accommodating changes in the radius of rotation of the linear accelerometer. In this regard, a chronograph such as a radar gun must be utilized to first measure the actual speed of the club head. The actual speed is measured when the club head is at the bottom of the down stroke, which is approximately the position of the club head during the swing when the ball is struck. After the actual speed of the club head is measured, the circuit board and the linear accelerometer are calibrated by the accelerometer calibrator using the actual velocity of the club head as measured by the chronograph. After calibration, the output of the linear accelerometer of the Gates reference will correspond to the actual velocity of the club head. However, it should be noted that the Gates reference does not claim nor does it disclose the measurement of the club head velocity. The Gates reference only discloses the receiving of a signal generated by the centrifugal acceleration.

In the Gates reference, the acceleration that is then displayed by the wrist-mounted device is the maximum acceleration measured by the linear accelerometer that is aligned with the shaft. However, the accelerometer will typically experience shock forces of 1000's of g's when the golf ball is struck. By comparison, acceleration of the club head before the ball is struck or during a practice swing is on the order of only about 100 g's in the centrifugal direction. Thus, the maximum acceleration that is measured in the Gates reference is due to the shock on the club head when it strikes the golf ball, rather than the (desired) acceleration of the club head at the instant prior to impact. Thus, as understood, the acceleration monitor assembly of the Gates reference is incapable of determining the velocity of the club head by using a linear accelerometer for measuring centrifugal force.

Furthermore, a second embodiment of the acceleration monitor assembly of the Gates reference uses a second linear accelerometer having an axis that must be oriented perpendicular to the path of movement of the club head and also perpendicular to the shaft axis. The second embodiment ostensibly allows the golfer to determine if the golf club is moving in a direction that is transverse to the golf ball (i.e., out of the plane of swing) at the time of impact, as is undesirable. Unfortunately, any misalignment of the second linear accelerometer causes it to measure a component of the acceleration in the tangential direction. Typically, the magnitude of accelerations of the club head at the instant prior to impact with the golf ball is about 100 g's in the centrifugal direction (i.e., aligned with the shaft), is less than 1 g in the angular direction (i.e., aligned parallel to the striking surface), and about 10 g's in the tangential direction (i.e., aligned in the direction of swing at impact). Thus, even a slight misalignment of the second linear accelerometer would cause it to measure a portion of the much greater tangential acceleration.

For example, if the circuit board and, hence, the second accelerometer were clipped onto the shaft with rotation or twisting of only 5 degrees out of the plane of swing, the second linear accelerometer would measure almost 1 g. Thus, unless the acceleration monitor assembly of the Gates reference were perfectly aligned on the shaft, resultant measurements of the second linear accelerometer would not be usable in determining whether or not the golf club is moving transverse to the golf ball at the time of impact. Furthermore, even if the acceleration monitor assembly were perfectly aligned on the shaft, it would not be possible to distinguish between twisting of the club face by the golfer or out-of-plane movement of the golf club using the second linear accelerometer as a cause of inaccurate directional movement of the golf ball (i.e., hooking or slicing).

Finally, the acceleration monitor assembly of the Gates reference suffers from another deficiency in that the circuit board is mounted on the shaft with a clip. Unfortunately, as mentioned above, the 1000's of g's that are transmitted to the accelerometer when the golf ball is struck could cause the clip to fracture and/or to fall off the golf club. In addition, low-cost linear accelerometers are incapable of withstanding such extreme shock and would therefore likely fail upon first impact of the club head with the golf ball.

Even if the acceleration monitor assembly used specially manufactured or scientific linear accelerometers that were capable of withstanding 1000's of g's of shock, such accelerometers would also need a much greater sensitivity than the typical 1 percent sensitivity such that they could provide useful measurements closer to the 10 g tangential acceleration of the club head. To emphasize this point, if the acceleration at impact were only 1000 g's, 1 percent thereof is 10 g's which is equal to the tangential acceleration of the club head. Thus, a standard accelerometer that could survive the shock at impact would unfortunately be incapable of measuring the change in accelerations that occur during a typical golf swing.

As can be seen, there exists a need in the art for a swing speed analyzer that can accurately measure the swinging speed of a swinging implement, including the velocity of the swinging implement, such as a golf club, at the instant prior to impact with an object such as a golf ball. Additionally, there exists a need in the art for a swing speed analyzer that can measure the swinging speed of a swinging implement at any point during the swing. Also, there exists a need in the art for a swing speed analyzer that is portable such that the swing speed analyzer may be interchangeably mounted on a variety of alternative swinging implements such as a variety of different golf clubs that are typically used by a golfer in playing a round of golf.

There also exists a need for a swing speed analyzer that uses commonly available, low-cost battery-powered accelerometers such that the overall complexity and cost of the swing speed analyzer may be reduced. Finally, there exists a need in the art for a swing speed analyzer that isolates the low-cost accelerometer from the shock forces produced when the ball is struck.

SUMMARY OF THE INVENTION

The present invention overcomes the aforementioned drawbacks associated with swing speed analyzers of the prior art. More particularly, the present invention is a swing speed analyzer having an accelerometer that may be detachably mounted upon a swinging implement, such as a golf club. The swing speed analyzer is configured to isolate the accelerometer from very high shock forces that are produced when the swinging implement strikes an object, such as a golf ball. The accelerometer may be configured to measure either centrifugal acceleration or tangential acceleration.

For configurations where the accelerometer measures centrifugal acceleration, the microprocessor is calibrated using a calibration factor. The measurement of centrifugal acceleration may then be used to determine maximum velocity of a striking end of the swinging implement using the formula $v=(a \times r)^{0.5}$, where a is the centrifugal acceleration, v is the tangential velocity, and r is the radius of rotation of the accelerometer. As is noted in the formula, the velocity is dependent on the value of the radius of rotation of the striking end r. Thus, the swing speed analyzer must be calibrated for a particular swinging implement having a given length such that the proper radius of rotation may be factored into the formula. For example, where the swinging implement is the golf club having a shaft and a club head, the swing speed analyzer is preferably calibrated for the particular shaft length of the golf club.

In addition, because the shaft of the golf club typically flexes during the swing, the calibration of the swing speed analyzer accounts for additional velocity of the club head occurring due to the release of potential energy when the shaft reflexes from its flexed position. By calibrating, the accuracy with which the swing speed analyzer measures acceleration may be improved. However, because the swing speed analyzer may typically be used on a driver type golf club of a given shaft length and stiffness instead of on multiple golf clubs having different shaft lengths, any limitations in measurement accuracy caused by change in shaft length, the swing speed analyzer still allows a user to extract useful data from centrifugal acceleration measurements.

The swing speed analyzer may also be configured such that the accelerometer measures tangential acceleration of the striking end during a forward swing of the swinging implement. It has been determined that a user of certain types of swinging implements typically axially rotates the swinging implement between swings. For example, prior to swinging a baseball bat, a batter typically adjusts their grip on the bat by slightly axially rotating the bat. It has also been determined that the user of certain types of swinging implements axially rotates the swinging implement during the forward swing. For the case of the golf club, a golfer typically axially rotates a shaft and, hence, the club head, during the forward swing due to natural physiological motions occurring in the golfer's torso, shoulders, arms and wrists.

More specifically, at the top of a back swing just prior to starting the forward swing, the club face of the club head is typically oriented approximately parallel to the plane of swing. However, as the forward swing of the golf club progresses, the club face axially rotates about the shaft through approximately ninety degrees so that the club face is oriented normal to the plane of swing when the club head impacts with the golf ball. Therefore, in order to accurately measure tangential acceleration of the club head, the accelerometer must be positioned such that tangential acceleration is measured with respect to the plane of swing, and not with respect to the axially rotating club face.

Importantly, by using a dual-axis accelerometer having a pair of orthogonally oriented axes, the axes can be positioned without regard to the orientation of the striking surface. With the dual-axis accelerometer, each axis measures a component of tangential acceleration in the direction of movement. A resultant tangential acceleration may then be calculated from the respective components thereof. The resultant tangential acceleration is the acceleration in the plane of swing. A processor or microcontroller of the swing speed analyzer is configured to calculate the resultant tangential acceleration and then to integrate the resultant tangential acceleration over time to determine tangential velocity of the striking end. The microcontroller may be further configured to integrate the tangential velocity over time in order to determine the distance traveled by the striking end. It should be noted that the microcontroller may also measure other types of swing parameters of the striking end including, but not limited to, duration of the forward swing and distance traveled by the striking end during the forward swing. The swing speed analyzer may include a display device that is configured to display at least one of the swing parameters.

BRIEF DESCRIPTION OF THE DRAWING

These as well as other features of the present invention will become more apparent upon reference to the drawings wherein:

FIG. 1 is a perspective view of a swing speed analyzer mounted on a shaft of a golf club in one aspect of the invention and further illustrating a wireless receiver worn on a wrist of a user of the swing speed analyzer;

FIG. 2 is a perspective view of the shaft-mounted swing speed analyzer illustrating the arrangement of first, second and third axes oriented orthogonally relative to one another and along which accelerations of the golf club may be respectively measured;

FIG. 2a is an enlarged perspective view of the shaft-mounted swing speed analyzer illustrating a shock attenuator disposed between the swing speed analyzer and the shaft and further illustrating a display window and an on/off switch as may be included with the swing speed analyzer;

FIG. 13a is a circular cross-sectional shape of the golf club shaft at a hosel end thereof and having a coefficient of drag of about 1.2.

FIG. 13b is an oval or elliptical cross-sectional shape in one embodiment of the housing having a coefficient of drag of about 0.45.

FIG. 13c is a preferred airfoil shaped cross-section shape of the housing having a coefficient of drag of about 0.29 and illustrating a preferred alignment thereof with a plane of swing of the golf club.

FIG. 14a is a schematic illustration of a single-degree-of-freedom spring/mass shock attenuator as incorporated into the swing speed analyzer of the present invention with the shock attenuator including an input acceleration, a spring mechanism, a damping mechanism and an output acceleration.

FIG. 14b is the shock attenuator of the swing speed analyzer corresponding to the single-degree-of-freedom spring/mass shock attenuator illustrated in FIG. 14a.

FIG. 14c illustrates plots of frequency vs. transmissibility ratio for a range of shock attenuators as may be incorporated into the swing speed analyzer.

DETAILED DESCRIPTION OF THE INVENTION

Figure 3:
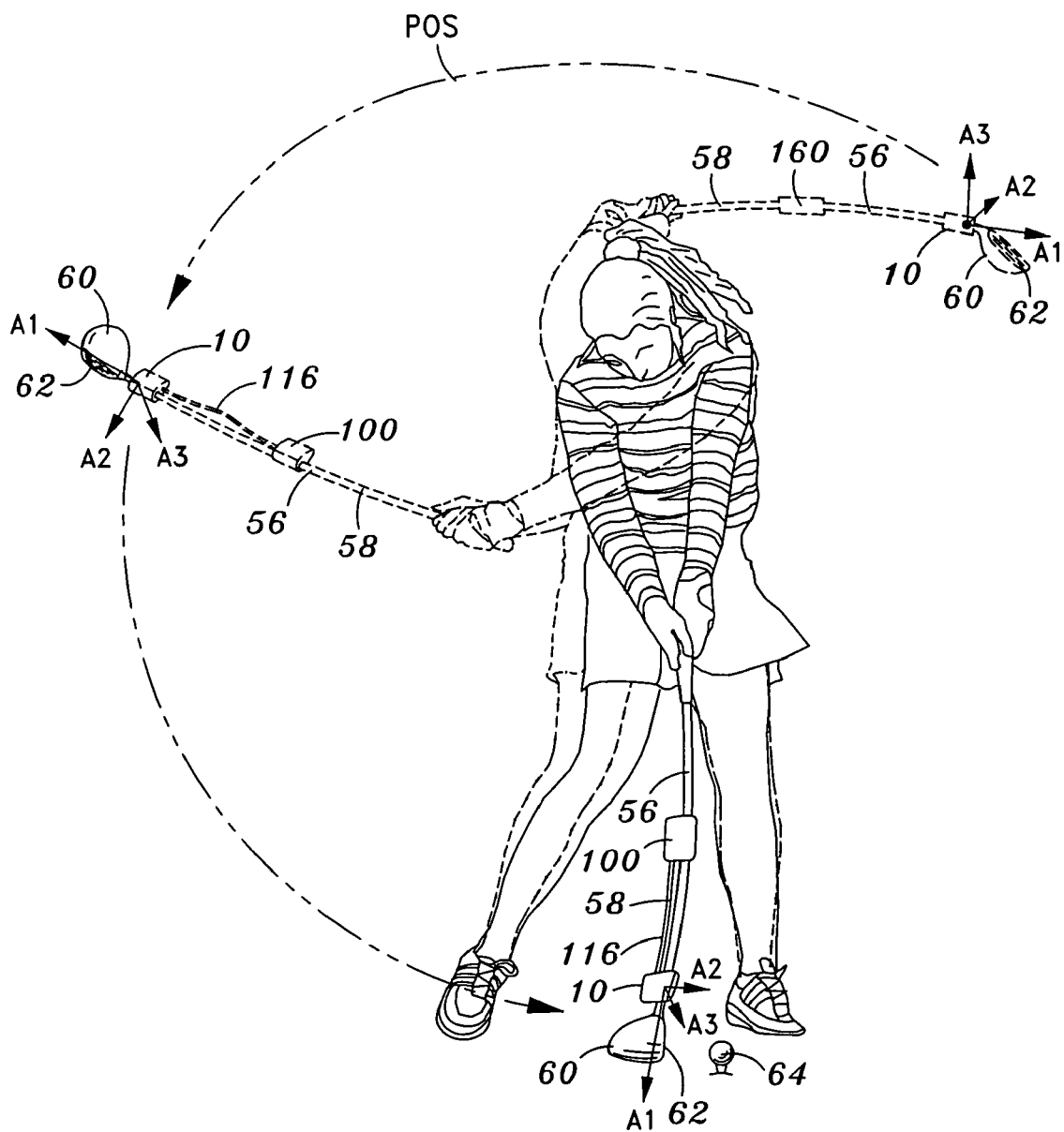
FIG. 3 is a perspective view of the user swinging the golf club with the relative orientation of the golf club being shown in sequence illustrating axial rotation of a club head with respect to a plane of swing of the golf club.

Referring now to the drawings wherein the showings are for purposes of illustrating various aspects of the invention and not for purposes of limiting the same, provided is a swing speed analyzer 10 as may be mounted on a swinging implement 12. The swing speed analyzer 10 is configured to measure a swing parameter during a forward swing of the swinging implement 12. As can be seen in FIGS. 1 and 2, the swinging implement 12 has a striking end 16 and a grip end 14 with the swing speed analyzer 10 preferably being mounted adjacent the striking end 16. The swing of the swinging implement 12 defines a plane of swing, indicated as POS in FIG. 3. The swinging implement 12 also defines a first axis A1 that extends therethrough from the grip end 14 to the striking end 16. The grip end 14 may be held or grasped by a user in swinging the swinging implement 12. The swing parameter may be measured during a swing of the swinging implement 12 wherein the striking end 16 may or may not strike or impact an object 40.

As will be described in greater detail below, the swing speed analyzer 10 is configured to measure swing parameters of a variety of types of swinging implements 12 including hand-held sporting implements having a shaft 58 coupled to a head 124. Such hand-held sporting implements may include, but are not necessarily limited to, a golf club 56, a baseball bat 36, a tennis racket and a hockey stick. Furthermore, the swing speed analyzer 10 is configured to measure various swing parameters including, but not limited to, centrifugal acceleration, tangential acceleration, tangential velocity, duration of the forward swing, and distance of travel of the striking end 16 during the forward swing. For the case where the swinging implement 12 is swung without striking the object 40, the swing is hereinafter referred to as a practice swing. For the case where the swinging implement 12 is swung such that the striking end 16 strikes or impacts the object 40, the swing is hereinafter referred to as a striking swing.

Referring to FIGS. 2 and 3, shown is a typical swing of the golf club 56 with the position of the golf club 56 being shown sequentially. As can be seen in FIG. 3, a club head 60 of the golf club 56 axially rotates with respect to the plane of swing POS of the golf club 56 during the forward swing. As an aid in an explanation of the dynamics of a typical swing of the golf club 56, three orthogonally-arranged directions or axes are defined in FIGS. 2 and 3. The first axis, indicated in FIGS. 2 and 3 as A1, is shown as being aligned with or oriented parallel to longitudinal direction of the swinging implement 12 such as a shaft 58 of the golf club 56. The first axis A1 may be referred to as the centrifugal direction. Also in FIGS. 2 and 3 is shown a second axis A2 oriented normal to a striking surface or a club face 62 of the golf club 56. The second axis A2 may be referred to as the tangential direction. A third axis A3 is shown in FIGS. 2 and 3 as being oriented parallel to the club face 62. The third axis A3 may be referred to as the out-of-plane direction. As was earlier mentioned, the golf club 56 may be swung in either a practice swing or a striking swing. In the striking swing, the club head 60 may impact with a golf ball 64. The following explanation of swing dynamics may be applied to striking swings as well as to practice swings.

As can be seen in FIG. 3, at the start of the forward swing, the golfer swings or rotates the golf club 56 such that the club head 60 rotatably moves toward the ground. As can be seen, at the start of the forward swing, the club face 62 is oriented approximately parallel to the plane of swing POS (i.e., the second axis A2 is oriented normal to the plane of swing POS). It will also be noted that during the forward swing, the club head 60 initially moves in a combined direction of the first axis A1 and the third axis A3. During the forward swing, the shaft 58 axially rotates causing the club face 62 to also axially rotate. As can be seen in FIG. 3, the club face 62 typically axially rotates approximately ninety degrees from a start of the forward swing at a top position of the swing until the club head 60 moves along the ground at a bottom position of the forward swing.

Due to this axial rotation of the shaft 58 shown in FIG. 3, the club head 60 moves in a combined direction of the second axis A2 and third axis A3. During a striking swing, at the point during the swing where the club face 62 impacts with the golf ball 64, the club face 62 has axially rotated such that the club head 60 essentially moves along the direction of the second axis A2. At a start of the forward swing, there is some movement in the direction of the first axis A1 (i.e., the centrifugal direction). However, it has been determined that such movement in the centrifugal direction at the start of the forward swing may be neglected without significant error in the measurement of swing parameters. Therefore, the movement of the club head 60 in the plane of swing POS may essentially be determined by calculating a resultant tangential acceleration from the movement in the second axis A2 (i.e., the tangential direction) and the third axis A3 (i.e., the out-of-plane direction).

Figure 6:
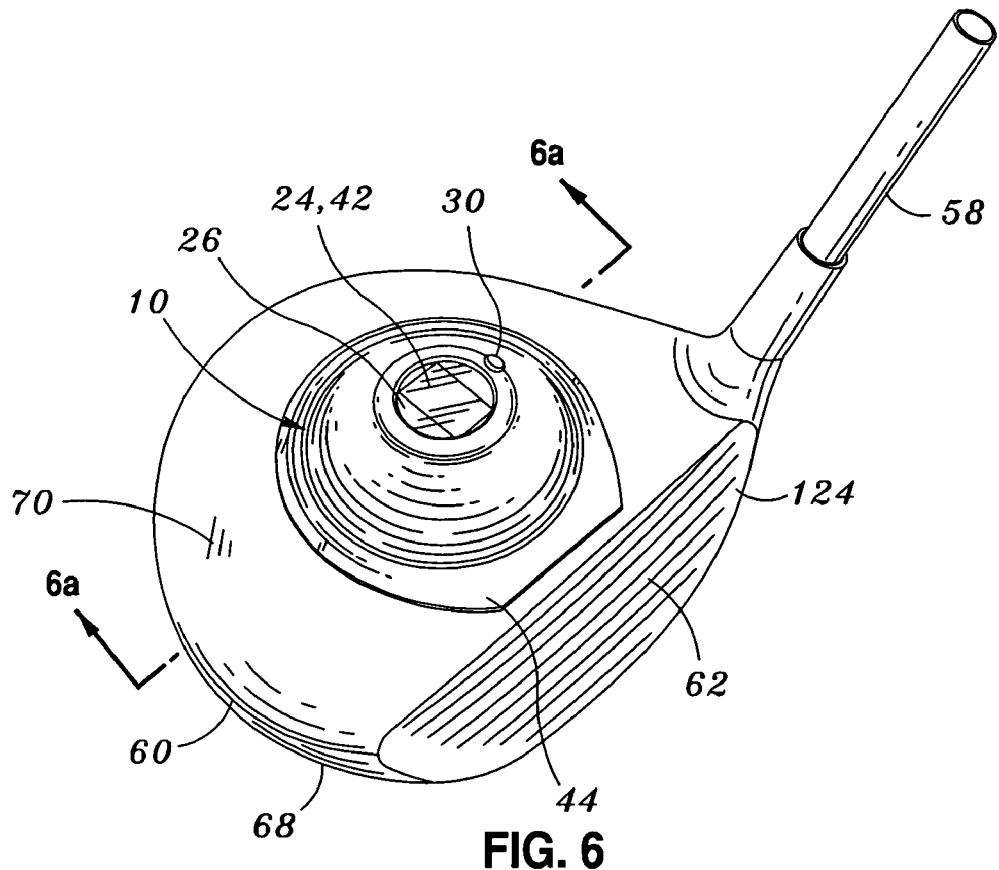
FIG. 6 is a perspective view of the swing speed analyzer mounted on a club head of a driver-type golf club in a further aspect of the invention.
Figure 6A:
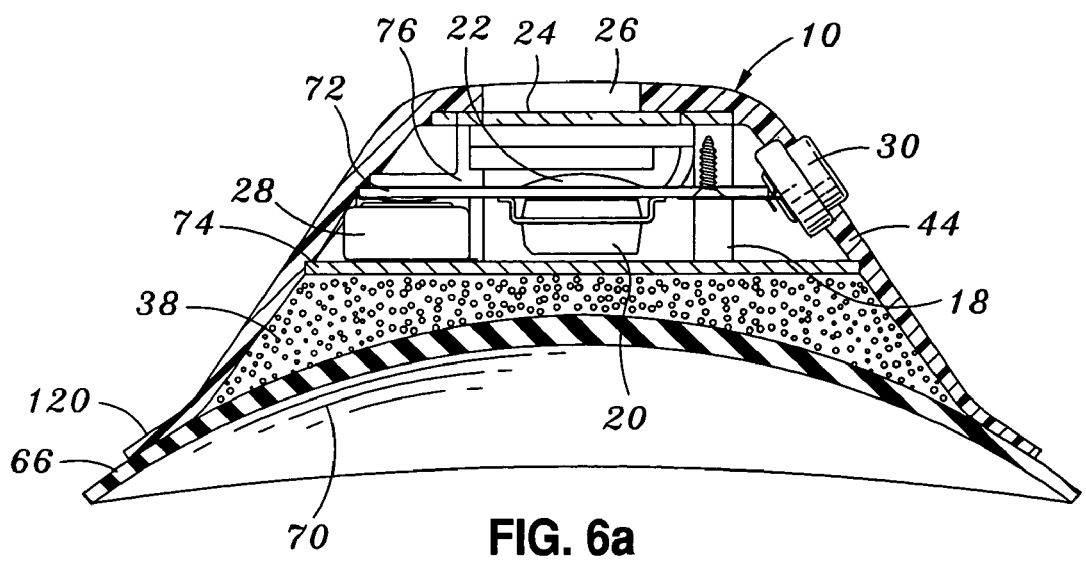
FIG. 6a is a cross-sectional view of the club head-mounted swing speed analyzer taken along line 6a-6a of FIG. 6 and illustrating components of the electronic assembly disposed within the housing.
Figures 12, 12A:
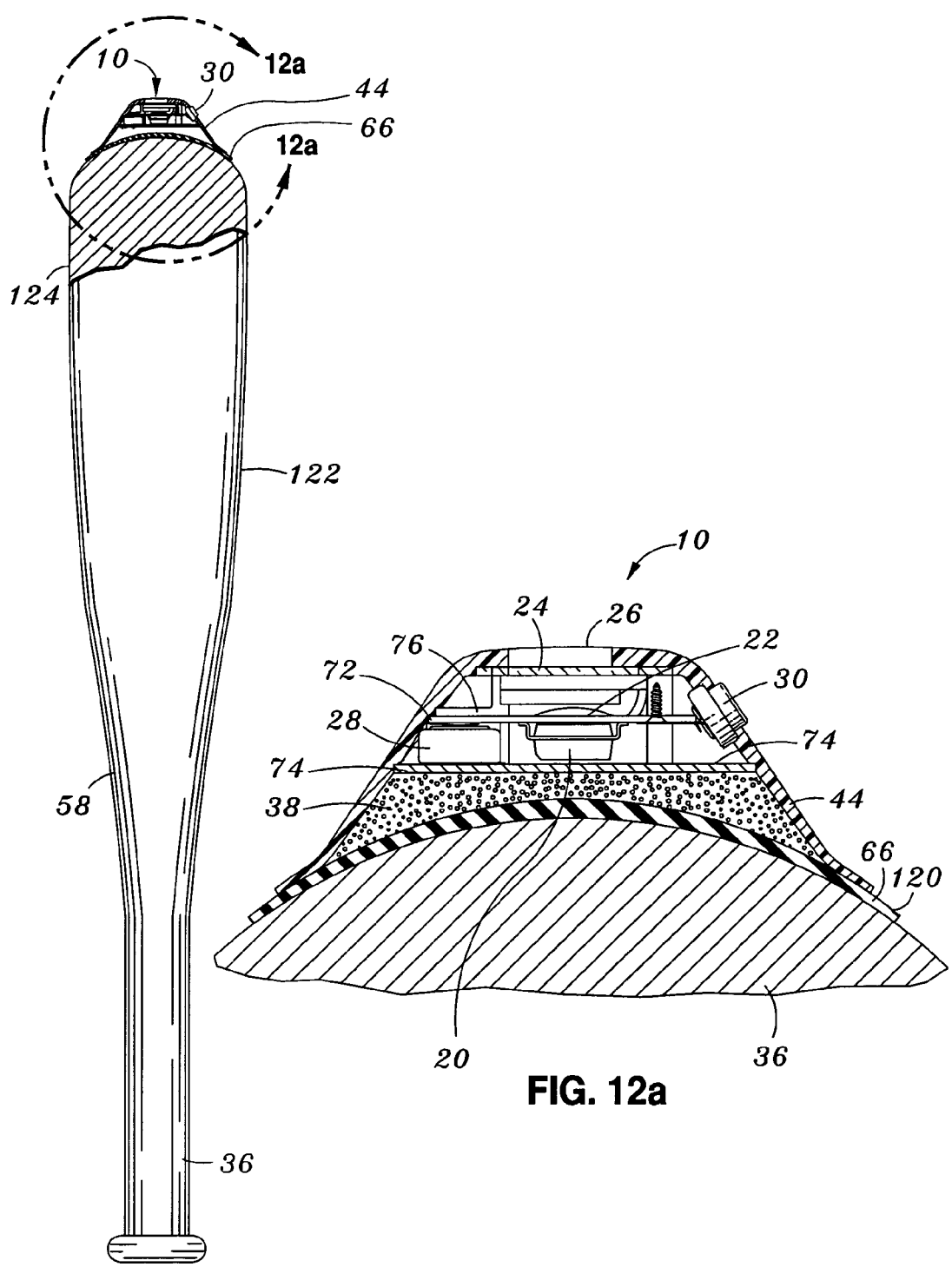
FIG. 12 is an elevational view of a baseball bat having the swing speed analyzer mounted thereon in another aspect of the invention.
FIG. 12a is an enlarged cross-sectional view of the swing speed analyzer as may be mounted on the baseball bat.

Referring to FIGS. 2 and 3, in an aspect of the invention, the swing speed analyzer 10 is shown mounted on the golf club 56. The golf club 56 of FIG. 2 has the shaft 58 with the striking end 16 being configured as the club head 60. The shaft 58 connects the club head 60 to the grip end 14. The swing speed analyzer 10 is preferably mounted near a hosel adjacent the club head 60 of the golf club 56. However, the swing speed analyzer 10 may also be mounted on the club head 60 as is shown in FIGS. 6 and 6a and as will be described in greater detail below. In addition, the configuration of the swing speed analyzer 10 shown in FIGS. 6 and 6a may be mounted on the baseball bat 36 adjacent the striking end 16 thereof, as is shown in FIG. 12 and as will be described in greater detail below.

Importantly, in each of the embodiments shown in the figures and described below, the swing speed analyzer 10 may be configured to be releasably attachable to the swinging implement 12. Furthermore, the swing speed analyzer 10 may include an attachment mechanism 120 that threadably and releaseably couples the swing speed analyzer 10 to the shaft 58 of the swinging implement 12, as will be described in greater detail below. Alternatively, the swing speed analyzer 10 may include an attachment mechanism 120, such as a suction cup 66, that non-threadedably couples the swing speed analyzer 10 to the shaft 58 of the swinging implement 12.

Figure 4A:
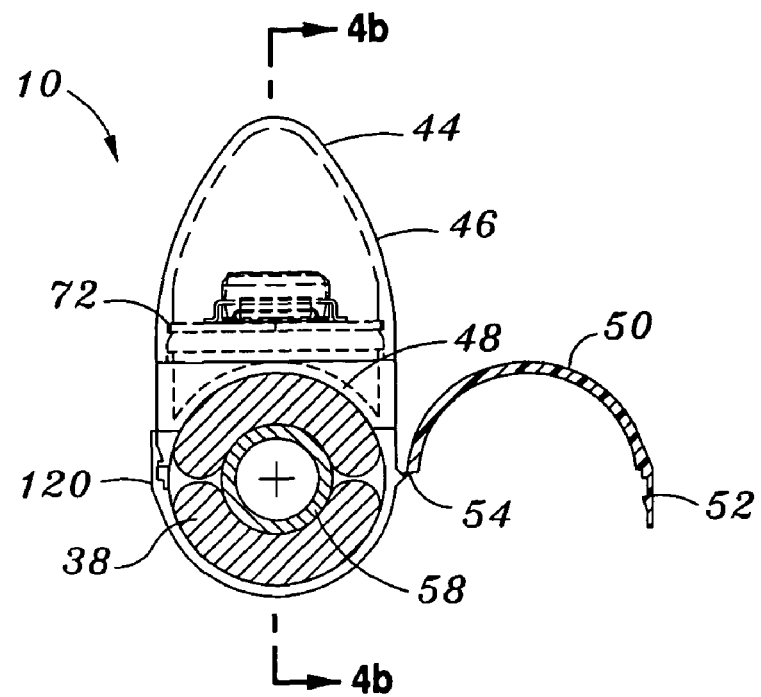
FIG. 4a is an axial cross-sectional view of the shaft-mounted swing speed analyzer shown in FIG. 1 having an accelerometer that is configured and oriented to measure centrifugal acceleration and further illustrating a shock attenuator disposed between the shaft and a housing of the swing speed analyzer.
Figure 4B:
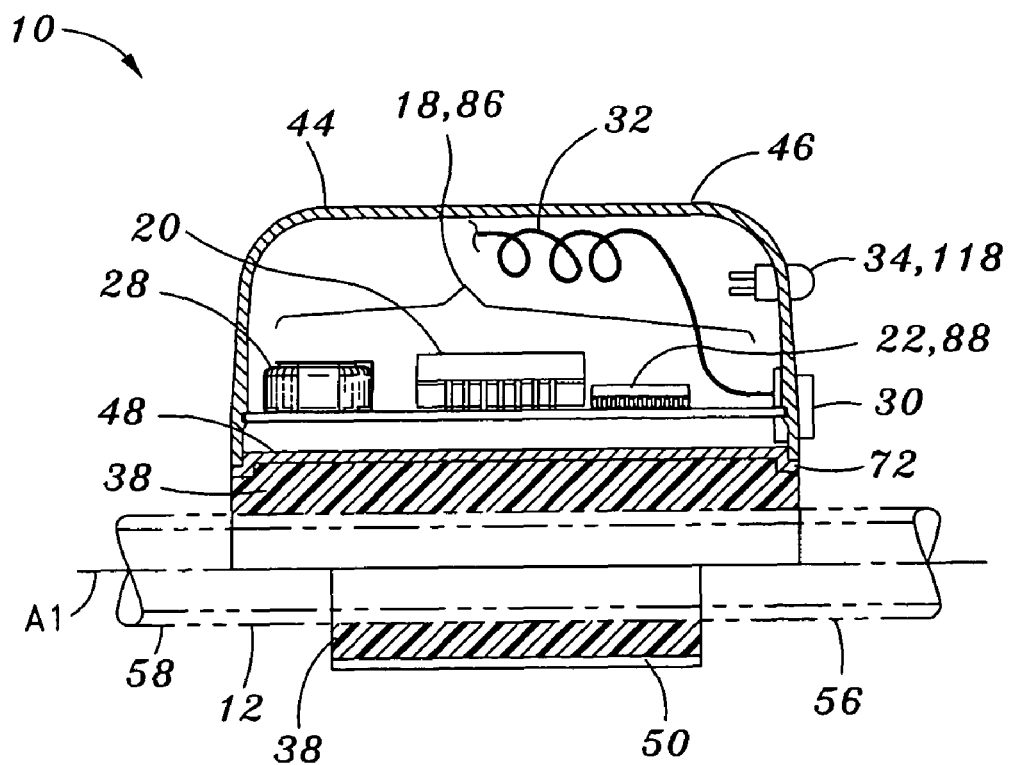
FIG. 4b is a longitudinal cross-sectional view of the shaft-mounted swing speed analyzer taken along line 4b-4b of FIG. 4a and illustrating an electronic assembly having the accelerometer mounted within the housing.

Referring now to FIGS. 4a and 4b, in an aspect of the invention, the swing speed analyzer 10 comprises an electronic assembly 18 connected to a power source 28. The power source 28 is configured to provide power to the electronic assembly 18. The electronic assembly may be releasably attached to the swinging implement 12. The electronic assembly 18 may also be housed within a housing 44. Advantageously, the housing 44 may be configured to be releasably mountable on the swinging implement 12 such as on the shaft 58 of the golf club 56. The releasable mounting of the housing 44 allows the swing speed analyzer 10 to be mounted on different types of swinging implements 12 such as different types of golf clubs 56, as may be desirable during playing of a round of golf. Importantly, a shock attenuator 38 may be interposed between the shaft 58 and the housing 44. As will be explained in greater detail below, the shock attenuator 38 may be configured to attenuate shock loads transmitted between the swinging implement 12 and the electronic assembly 18 during a striking swing.

Figure 5A:
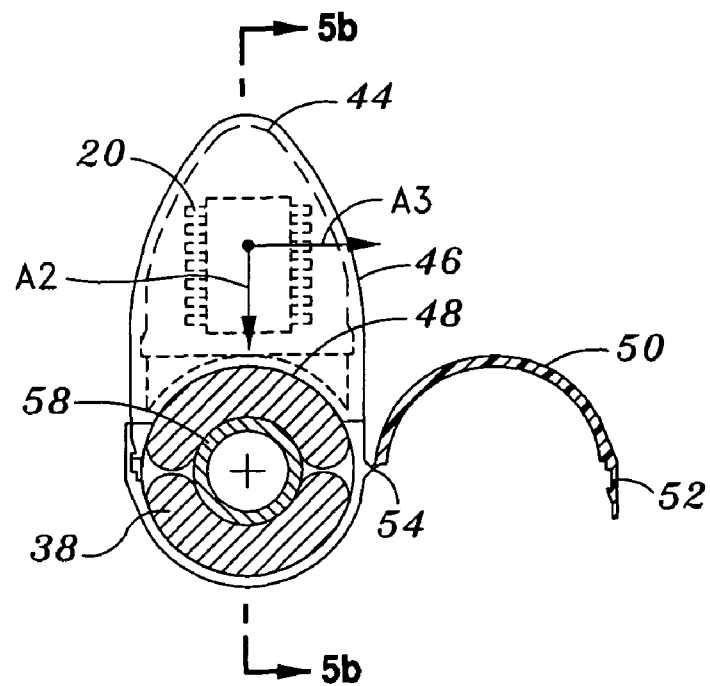
FIG. 5a is an axial cross-sectional view of the shaft-mounted swing speed analyzer shown in FIG. 1 having a dual-axis accelerometer that is configured and oriented to measure tangential acceleration and illustrating the shock attenuator disposed between the shaft and the housing.
Figure 5B:
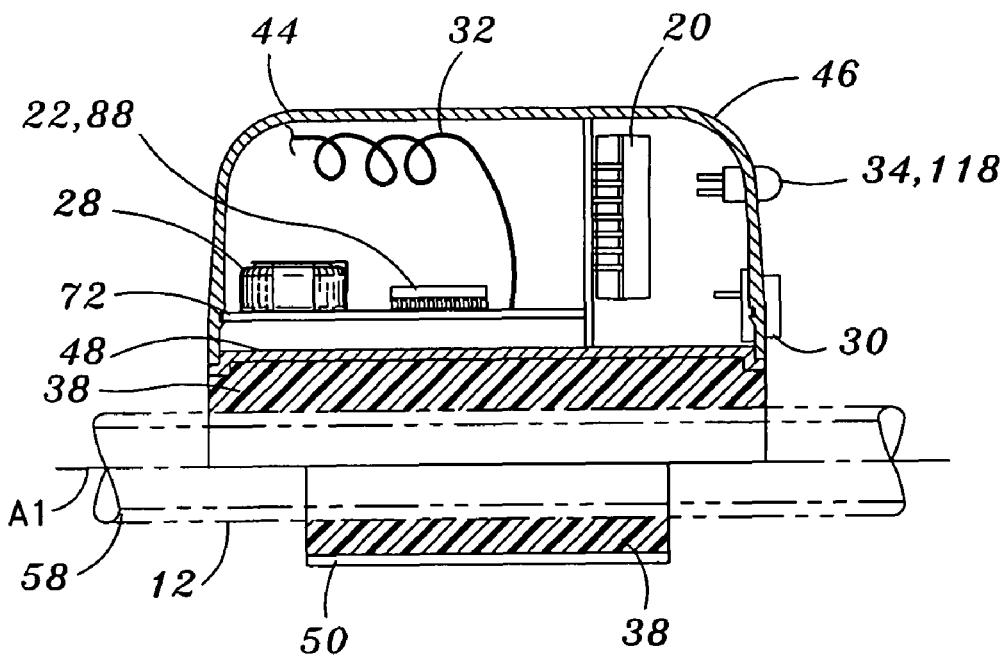
FIG. 5b is a longitudinal cross-sectional view of the shaft-mounted swing speed analyzer taken along line 5b-5b of FIG. 5a and illustrating the electronic assembly having the dual-axis accelerometer mounted within the housing.

The electronic assembly 18 may include at least one accelerometer 20 such as a first accelerometer that provides a first output. Optionally, the electronic assembly 18 may include a second accelerometer 20 which provides a second output. The electronic assembly 18 may also include at least one processor 22 such as a microprocessor or microcontroller which uses the first output and/or second output from the accelerometer(s) 20 to compute a swing speed. The accelerometer 20 and the microcontroller 22 may be mounted on a circuit board 72. The electronic assembly 18 may include at least one display device 24, as can be seen in FIGS. 2a, 6a and 12a. The first accelerometer 20 may be configured as a single-axis accelerometer 20 as is shown in FIGS. 4a and 4b, or as a dual-axis accelerometer 20, as is shown in FIGS. 5a and 5b and as will be described in greater detail below. Likewise, the second accelerometer 20 may be configured as a single-axis accelerometer 20 or as a dual-axis accelerometer 20. Furthermore, the accelerometer 20 may comprise a pair of accelerometers 20 having respective accelerometer axes that are substantially orthogonally juxtaposed or aligned relative to each other. It is contemplated that the accelerometer 20 may be configured in any number of alternative arrangements. For purposes of the following description of the swing speed analyzer 10, each of the above configurations and combinations of accelerometers 20 are hereinafter referred to as "accelerometer" 20 unless otherwise noted.

The accelerometer 20 may be electrically connected to the processor 22, as may the display device 24, if included. The display device 24 is configured to display the swing parameter. The processor 22 is operative to cause the display device 24 to generate a visual indication of the swing parameter. Importantly, the accelerometer 20 is configured to measure acceleration of the swinging implement 12. The accelerometer 20 is also configured to generate an output signal that is representative of the acceleration. The accelerometer 20 may be surface-mounted to the circuit board 72 wherein an axis of the accelerometer 20 (i.e., the axis along which the acceleration is measured) is oriented normal to the circuit board 72. For configurations wherein the accelerometer 20 is configured to measure centrifugal acceleration, the circuit board 72 is preferably oriented such that the axis of the accelerometer 20 is substantially aligned with or is oriented substantially parallel to the plane of swing POS of the swinging implement 12. However, the accelerometer 20 may be configured such that the axis of the accelerometer 20 is oriented substantially normal or perpendicular to the first axis A1. Such alignment of the accelerometer 20 with the plane of swing POS and/or with the first axis A1 improves the accuracy with which the accelerometer 20 measures centrifugal acceleration.

In FIGS. 4a and 4b, the single-axis accelerometer 20 shown is configured to measure centrifugal acceleration in the direction parallel to the shaft 58 of the golf club 56 (i.e., along the first axis A1). The accelerometer 20 may advantageously be mounted on the circuit board 72, which may be oriented substantially parallel to the first axis A1 of the swinging implement 12, as shown in FIGS. 4a and 4b. Alternatively, the circuit board 72 may be oriented approximately ninety degrees to the orientation shown in FIGS. 4a and 4b, such that the circuit board 72 is oriented approximately normal to the striking surface. However, it should be noted that the accelerometer 20 could also be configured to measure acceleration in the direction normal to the surface upon which it is mounted. For accelerometers 20 of such a configuration, the circuit board 72 may advantageously be oriented to be substantially normal to the axis A1, as is shown in FIGS. 5a and 6.

Referring to FIGS. 6 and 6a, shown is the swing speed analyzer 10 mounted on the club head 60 of a driver-type golf club 68 in a further aspect of the invention. An attachment mechanism 120 such as the suction cup 66 may be included with the swing speed analyzer 10 wherein the suction cup 66 is configured to be detachably mounted on a top surface 70 of the club head 60. In such a configuration, the shock attenuator 38 may be configured to be mounted on the suction cup 66 so as to attenuate shock loads that may otherwise be transmitted from the club head 60 to the electronic assembly 18 and, hence, to the accelerometer 20 during a striking swing. The housing 44 may be attached to the shock attenuator 38 and may be configured to house the electronic assembly 18. In FIGS. 6 and 6a, the accelerometer 20 shown is configured to measure a component of centrifugal acceleration in a direction parallel to the shaft 58. Therefore the accelerometer 20 may advantageously be mounted on the circuit board 72 that is preferably oriented to be substantially parallel to the club head 60 of the golf club 56.

For a driver-type golf club 68, the top surface 70 thereof is typically angled at about thirty degrees relative to the first axis A1. Because of the thirty degree offset of the top surface 70 from the first axis A1, the accelerometer 20 measures about eighty-seven percent (i.e., the cosine of thirty degrees) of the centrifugal acceleration along the first axis A1. In addition, because of the thirty degree offset, the accelerometer 20 may also pick up or measure about fifty percent of the acceleration along the third axis A3. However, during a typical swing of the golf club 56, it is believed that the magnitude of acceleration in the direction of the third axis A3 is negligible relative to the magnitude of centrifugal acceleration as well as the magnitude of tangential acceleration along the third axis A3 during the forward swing. Therefore, it is believed that acceleration measured by the accelerometer 20 along the third axis A3 has a negligible effect on the accuracy of centrifugal acceleration measurements.

The processor 22 in FIGS. 4a, 4b, 5a, 5b, 6, 6a 12a is connected to the accelerometer 20 and is configured to sample the output signal over time during the forward swing of the swinging implement 12. Based on the output signal, the processor 22 may determine the swing parameter of the striking end 16. For the configuration shown in FIGS. 4a and 4b where the accelerometer 20 is configured to measure centrifugal acceleration during a practice swing, in order to determine tangential velocity of the striking end 16, the processor 22 may sample the output signal during the forward swing of the swinging implement 12 and store the centrifugal acceleration.

Using correlation factors or calibration factors, the processor 22 may then determine the tangential velocity using the stored measurement of centrifugal acceleration. The correlation factors may be determined using an external measuring device (not shown) configured to measure maximum tangential velocity of the striking end 16 at any point during the forward swing, such as at a bottom of the forward swing. During a golf swing, the bottom of the forward swing is typically the point at which the club face 62 (i.e., the striking surface) impacts with a golf ball 64. The tangential velocity of the striking end 16 can then be correlated to a corresponding magnitude or level of centrifugal acceleration at the same point during the forward swing (i.e., at the bottom of the swing).

Figure 8:
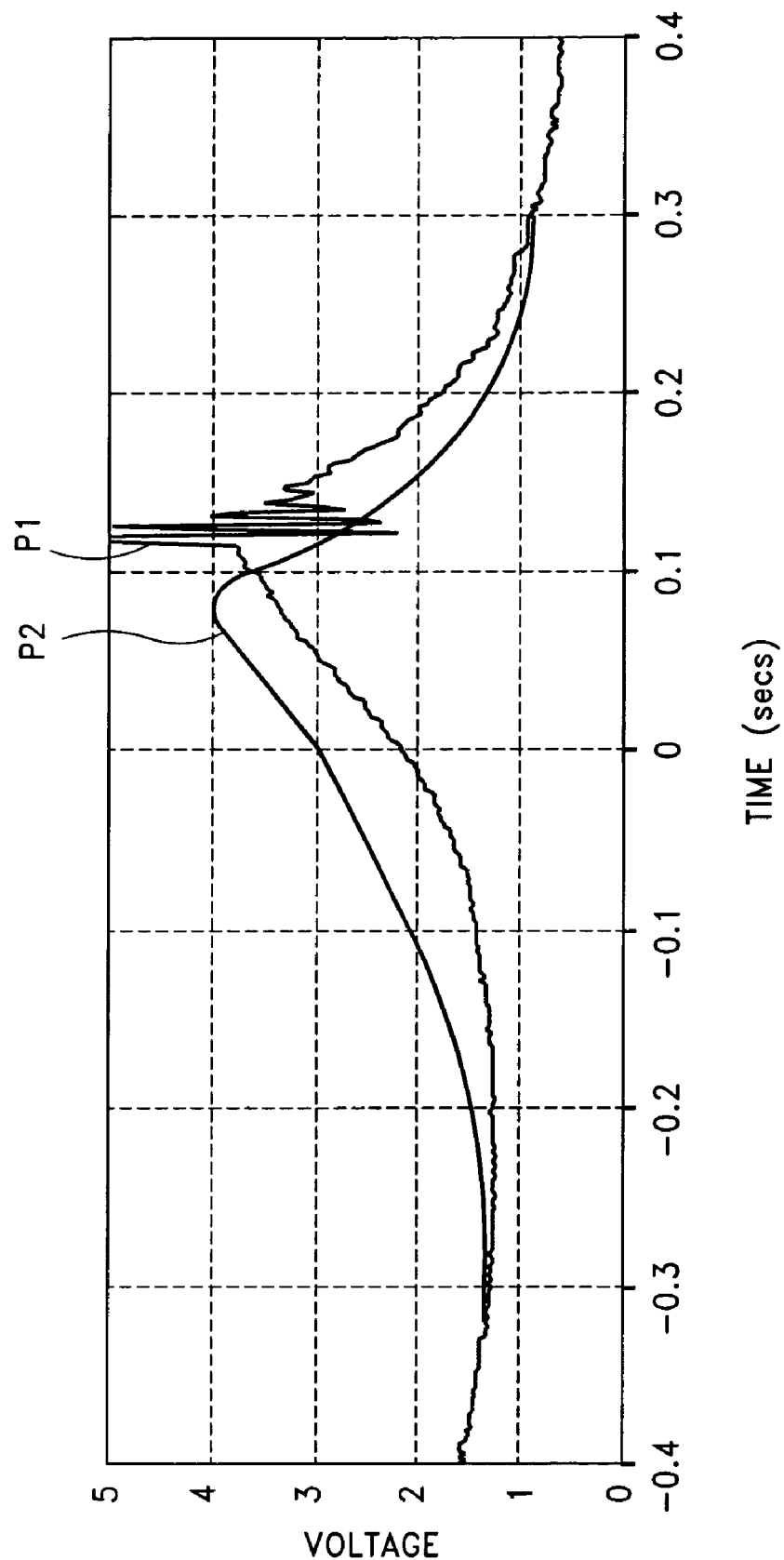
FIG. 8 is a plot of voltage output from an accelerometer configured to measure centrifugal acceleration vs. time for a practice swing and for a striking swing wherein the swinging implement strikes an object resulting in a substantial increase in the voltage output from the accelerometer.

Referring to FIG. 8, shown is a plot of voltage output from the accelerometer configured to measure centrifugal acceleration vs. time for a practice swing and for a striking swing wherein the swinging implement 12 strikes the object resulting in a substantial increase in the voltage output from the accelerometer 20. As can be seen, the point P1 on the plot indicates the point during the swing wherein the swinging implement 12 strikes the object 40 resulting in a substantial increase in the voltage output from the accelerometer 20. Conversely, a point P2 on the plot of the practice swing indicates the point during the swing wherein the maximum tangential acceleration of the striking end 16 occurs.

In FIG. 8, the centrifugal acceleration is represented by the output signal, which may be plotted as a voltage signal. The set of correlation factors can be developed to allow correlation of a given magnitude of centrifugal acceleration with a corresponding magnitude of tangential velocity. The correlation factors may be pre-programmed into the processor 22. Once pre-programmed with the correlation factors, the processor 22 can then be configured to convert centrifugal acceleration to tangential velocity using the correlation factors. The processor 22 may be further operative to cause the display device 24 to display the tangential velocity.

Maximum tangential velocity of the striking end 16 may be determined in a similar manner. The processor 22 may be configured to sample the output signal and determine a maximum centrifugal acceleration of the striking end 16 during the forward swing. The processor 22 may be configured to convert the maximum centrifugal acceleration to a maximum tangential velocity using a correlation factor in the manner described above. The processor 22 may be further operative to cause the display device 24 to display the maximum tangential velocity.

For the case where the accelerometer 20 is configured to measure centrifugal acceleration during the striking swing, it has been determined that the impact of the striking end 16 with the object 40 results in a substantial increase in the magnitude of the centrifugal acceleration. The processor 22 is configured to sample the output signal, which may be a voltage signal, from a start of the forward swing until point of impact indicated as P1 on the plot of FIG. 8. The processor 22 may determine centrifugal acceleration an instant prior to impact. The processor 22 is further configured to convert the centrifugal acceleration to tangential velocity using the correlation factor. The processor 22 is further operative to cause the display device 24 to display the tangential velocity. In order to allow the user of the swing speed analyzer 10 to distinguish between a striking swing and a practice swing, the processor 22 may be operative to cause the display device 24 to display a notation indicating whether the object 40 is struck during the forward swing.

For the case where the swinging implement 12 is the golf club 56 (such as the driver-type golf club 68) and the object 40 is the golf ball 64, impact of the club head 60 with the golf ball 64 results in a substantial increase in the magnitude of centrifugal acceleration of the club head 60. In the same manner as was earlier mentioned, the processor 22 is configured to sample the output signal from the start of the forward swing until impact and determine the centrifugal acceleration of the club head 60 an instant prior to impact of the club head 60 with the golf ball 64. The processor 22 is also configured to convert the centrifugal acceleration of the club head 60 to tangential velocity using the correlation factor. The processor 22 is operative to cause the display device 24 to display the tangential velocity in the same manner as was described above.

For configurations of the swing speed analyzer 10 utilizing the dual-axis accelerometer 20 configured for measuring components of tangential acceleration, the dual-axis accelerometer 20 measures the tangential acceleration in a direction parallel to its mounting surface, as can be seen in FIGS. 5a and 5b. The accelerometer axes are preferably oriented substantially orthogonally or perpendicular to one another. Therefore, the accelerometer 20 may advantageously be mounted on the circuit board 72 in a substantially normal orientation relative to the first axis A1. In this manner, the accelerometer axes may be oriented to be substantially aligned with the second and third axes A2, A3 as described above and as is shown in FIGS. 2 and 3. The dual-axis accelerometer 20 is configured to measure respective components of the tangential acceleration of the swinging implement 12 and generate respective output signals representative of the components of the tangential acceleration.

The swing speed analyzer 10 having the dual-axis accelerometer 20 (for measuring tangential acceleration) is configured somewhat similar to the swing speed analyzer 10 having the single-axis accelerometer 20 (for measuring centrifugal acceleration). The electronic assembly 18 shown in FIGS. 5a and 5b is comprised of the dual-axis accelerometer 20, at least one processor 22, and at least one display device 24 (not shown in FIGS. 5a and 5b), all of which may be mounted on the circuit board 72 in a manner similar to that described above. The power source 28 is connected to the electronic assembly 18 and is configured to provide power thereto. The electronic assembly 18 and the power source 28 may be mounted within the housing 44 in a manner similar to that described above. The housing 44 may be configured to be detachably mounted on the shaft 58 of the golf club 56.

The processor 22 is connected to the dual-axis accelerometer 20 and is configured to sample the output signals generated thereby and determine the resultant tangential acceleration. Based on the resultant tangential acceleration, various types of the swing parameters may be determined. For example, in order to determine the tangential velocity of the striking end 16, the processor 22 may integrate the resultant acceleration over time from a start of the forward swing until occurrence of maximum tangential acceleration of the striking end 16, such as the club head 60. In another example wherein the impact of the striking end 16 with the object 40 results in a substantial increase in the magnitude of the tangential acceleration, the processor 22 is configured to integrate the output signal from the start of the forward swing until impact in order to determine the tangential velocity of the striking end 16.

However, various other types of the swing parameters may be determined by the processor, as will be described in greater detail below. It should be noted that a version of the swing speed analyzer 10 having the dual-axis accelerometer 20 may be mounted on various types of swinging implements 12 including, but not limited to, the tennis racket, the hockey stick and the baseball bat 36. In addition, the version of the swing speed analyzer 10 having the dual-axis accelerometer 20 may also be mounted on the golf club 56, including the driver-type golf club 68, in a manner similar to that shown and described above for the version having the single-axis accelerometer 20.

Referring to FIGS. 2a, 6, 6a and 12a, shown is the display device 24 that may be configured to display the swing parameter. Following sampling of the output signal, the processor 22 of the electronic assembly 18 may be operative to cause the display device 24 to generate a visual indication of the swing parameter. After at least one swing of the swinging implement 12, a user of the swing speed analyzer 10 may observe or read the visual indication that is displayed on the display device 24 of the swing speed analyzer 10. In this manner, the user may read various swing parameters of a just-completed swing or a series of just-completed swings in order to improve the user's swing. For example, a golfer may observe measurements of tangential velocity of the club head 60 of a driver-type golf club 68 as may be measured by the swing speed analyzer 10 during a round of golf. By observing such tangential velocity measurements, the golfer may determine whether a magnitude of tangential velocity of a particular swing is higher or lower than the tangential velocity of an average or typical swing by the same golfer.

In this manner, the golfer may assess and correct for particular deficiencies that may exist in the golfer's swing. In like manner, a batter may observe tangential velocity as measured during swings of the baseball bat 36 to correct for deficiencies in the batter's swing. As can be seen, the swing speed analyzer 10 can be used to assess and correct for particular deficiencies that may exist in the user's swing of any type of swinging implement 12 upon which the swing speed analyzer 10 is mounted.

In FIGS. 2a, 6, 6a and 12a, shown is the display device 24 disposed within the housing 44. In an alternative arrangement, the display device 24 may also be disposed within the housing 44 as shown in FIGS. 4a, 4b, 5a and 5b. It is contemplated that the display device 24 may be configured as a visual display 126 such as liquid crystal display 42 similar to the type commonly utilized in digital watches. The liquid crystal display 42 may be configured to generate a numeric display of the swing parameter. However, it is contemplated that the display device 24 may be configured in a wide variety of alternative devices including, but not limited to, a light emitting diode display, a light emitting polymer display, a plasma display or a digital flat panel, etc. Regardless of the type used with the swing speed analyzer 10, the display device 24 is configured to generate a numeric display of the swing parameter. In this manner, the user of the swing speed analyzer 10 may readily determine swing parameters such as velocity during a swing of the swinging implement 12.

For the case where the swinging implement 12 is the golf club 56, the first axis A1 extends along the shaft 58 of the golf club 56, as is shown in FIGS. 1, 2 and 3. For the case where the swinging implement 12 is the baseball bat 36, the first axis A1 extends from the grip end 14 to the striking end 16 of the bat 36, as can be seen in FIG. 12. In this same manner, it is contemplated that the dual-axis accelerometer 20 may be mounted on a wide variety of swinging implements 12.

Regardless of the particular type of the swinging implement 12, the dual-axis accelerometer 20 or the pair of the accelerometers is preferably mounted adjacent the striking end 16 of the swinging implement 12. For the pair of accelerometers 20, each one of the accelerometers 20 has an accelerometer axis. Regardless of whether the pair of accelerometers 20 or the dual-axis accelerometer 20 is used, the accelerometer axes are preferably oriented substantially orthogonally or perpendicularly relative to one another. In addition, each one of the accelerometer axes is preferably oriented to be substantially normal to the first axis A1. The dual-axis accelerometer 20 or the pair of the accelerometers 20 is configured to measure respective components of the tangential acceleration of the swinging implement 12 and generate respective output signals representative of the components of the tangential acceleration in a manner similar to that described above.

Importantly, the dual-axis accelerometer 20 or the pair of the accelerometers 20 eliminates the requirement that either one of the accelerometer axes be substantially aligned with or oriented parallel to the plane of swing POS of the swinging implement 12. Thus, the dual-axis accelerometer 20 or the pair of the accelerometers 20 allows for relatively accurate tangential acceleration measurements of the striking end 16 regardless of the orientation of the accelerometers 20 relative to the plane of swing POS. Such a feature is important for swinging implements 12 wherein the user may axially rotate the swinging implement 12 between swings.

For example, the swing speed analyzer 10 may be mounted on the baseball bat 36, as shown in FIG. 12. Typically, a batter axially rotates the bat 36 with respect to the plane of swing POS prior to swinging the bat 36. Furthermore, during a forward swing of the bat 36, the batter typically axially rotates the bat 36 approximately ninety degrees with respect to the plane of swing POS, similar to the way a golfer rotates the shaft 58 of the golf club 56, as can be seen in FIG. 3. Advantageously, the dual-axis accelerometer 20 compensates for the axial rotation of the bat 36 by computing a resultant of components of the tangential acceleration.

In such an arrangement, the processor 22 is configured to sample the output signals representative of the pair of accelerometers 20 and compute a resultant tangential acceleration of the swinging implement 12. The processor 22 is connected to the accelerometer 20 and is configured to integrate the resultant tangential acceleration over time to determine the swing parameter of the striking end 16 of the bat 36. The processor 22 may be configured to integrate the resultant tangential acceleration in order to determine a velocity of the striking end 16 of the bat 36. The processor 22 may be further configured to integrate the output signal from a start of the forward swing until occurrence of maximum tangential acceleration of the striking end 16 of the bat 36. In this manner, the processor 22 may determine the maximum velocity of the bat 36.

As was earlier mentioned, the user of the swing speed analyzer 10 may swing the swinging implement 12 in the striking swing. For example, as shown in FIG. 3, the golfer may swing the golf club 56 such that it impacts with the golf ball 64. The impact of the striking end 16 with the object 40 results in a substantial increase in a magnitude of acceleration of the striking end 16. The substantial increase in the magnitude of acceleration may also be referred to as shock. Such a substantial increase in the magnitude of the acceleration is graphically illustrated in FIG. 8, which illustrates plots of voltage vs. time for a practice swing and for a striking swing.

The point indicated by P1 on the graphs of FIG. 8-11 illustrates the point during the striking swing when the swinging implement 12 strikes the object 40. As can be seen, the substantial increase in the magnitude of the acceleration of the striking end 16 results in a substantial increase in voltage output of the accelerometer. Advantageously, the processor 22 may be configured to integrate the output signal from a start of the forward swing until occurrence of the substantial increase in the magnitude of the tangential acceleration in order to determine the velocity of the striking end 16 at an instant prior to impact of the striking end 16 with the object 40.

As was earlier mentioned, it is typically desirable that the maximum velocity of the striking end 16 occurs at impact with the object 40 in order to impart maximum energy to the object 40 that is struck. For the case of the golf club 56 wherein the club head 60 has a club face 62, the impact of the club face 62 with the golf ball 64 results in high shock levels that are measured by the accelerometer 20 as a substantial increase in magnitude of the acceleration followed by rapid oscillations in the acceleration, as is graphically illustrated in FIG. 8-10. The processor 22 is configured to integrate the output signal from a start of the forward swing until impact of the club face 62 with the golf ball 64, indicated by the point P1 on the plots. The impact of the club face 62 with the golf ball 64 causes the substantial increase in the magnitude of tangential acceleration. In this manner, the processor 22 may determine the maximum velocity of the club head 60 and cause the display device 24 to display the maximum velocity of the club head 60.

As was earlier mentioned, a practice swing occurs when the swinging implement 12 is swung such that the striking end 16 does not strike the object 40. A striking swing occurs when the striking end 16 impacts with the object 40. The processor 22 may further be operative to cause the display device 24 to display a notation indicating whether an object 40 is struck during a swing. In this manner, the user of the swing speed analyzer 10 may distinguish a practice swing from a striking swing when analyzing or observing displays of swing parameters of a series of swings of the swinging implement 12. Such notation may be displayed on the display device 24 with the swing parameter of a just-completed swing.

For example, for the case of a striking swing, the notation may be displayed in the form of a letter of the alphabet or a special character or symbol that may be displayed next to a numerical display of the maximum tangential velocity of the striking end 16. Alternatively, the notation may be displayed in the form of an indicating light that is displayed adjacent the display of the swing parameter on the display device 24. As will be appreciated, there are an infinite number of methods by which the notation may be displayed such that a user may distinguish between a striking swing and a practice swing.

Referring to FIGS. 4a, 4b, 5a, 5b and 6a, shown is the shock attenuator 38 that may be included with the swing speed analyzer 10. As is shown, the shock attenuator 38 is preferably disposed between the electronic assembly 18 and the swinging implement 12. Importantly, the shock attenuator 38 is configured to attenuate shock loads that may be transmitted between the swinging implement 12 and the electronic assembly 18. More specifically, the shock attenuator 38 is preferably comprised of a material that is sized and dimensioned to dampen an impact shock wave by more than 50% at about 125 Hz. As was earlier mentioned, the striking end 16 of the swinging implement 12 may experience extremely high levels of acceleration (i.e., shock) when an object 40, such as a golf ball 64, is struck. For example, a typical swing of the golf club 56 may result in the generation of shock forces on the order of 1000's of g's when the golf ball 64 is struck by the club head 60. Unless the accelerometer 20 is isolated from such extreme shock, the accelerometer 20 may experience the high shock forces with the result that the accelerometer 20 and the electronic assembly 18 may fail.

It is contemplated that the shock attenuator 38 as shown in FIGS. 4a, 4b, 5a, 5b and 6a may be comprised of any viscoelastomeric material. It is further contemplated that such viscoelastomeric material may comprise foam. In this regard, the viscoelastomeric material may be comprised of a layer of the foam interposed between the housing 44 and the swinging implement 12 itself. For the case where the swinging implement 12 is the golf club 56, the viscoelastomeric material may be interposed between the shaft 58 of the golf club 56 and the housing 44 in the manner shown in FIGS. 4a, 4b, 5a and 5b. When interposed in this manner, at least a portion of the shock that is transmitted from the club head 60 to the electronic assembly 18. Importantly, the material preferably has a material thickness and a material stiffness configured to dampen an impact shock wave by more than about 50% at about 125 Hz, as was mentioned above.

Referring briefly to FIG. 14a, the function of the shock attenuator 38 is very similar to the function of a single-degree-of-freedom spring/mass shock attenuator which is incorporated into the swing speed analyzer 10. As can be seen, the shock attenuator 38 includes a mass that is mounted on a base member by means of a spring mechanism. Importantly, as is shown in FIG. 14a, the shock attenuator 38 includes a damping mechanism. An input acceleration is transferred from the base member across the spring mechanism to the mass. The damping mechanism and spring mechanism cooperate to attenuate the input acceleration such that the output acceleration is reduced.

Referring now to FIG. 14b, shown is the shock attenuator 38, which corresponds to the single-degree-of-freedom spring/mass shock attenuator 38 illustrated in FIG. 14a. The mass of FIG. 14a corresponds to a combined mass of the housing 44 and the enclosed electronic assembly shown in FIG. 14b. The spring mechanism of FIG. 14a corresponds to the layer of viscoelastomeric material (i.e., foam layer). The damping mechanism of FIG. 14a corresponds to viscoelastic damping properties of the foam. The shock attenuator 38 as described above is also commonly referred in the art as a shock isolation system. The shock attenuator 38 as described above and shown in FIG. 14a has a natural frequency that may be calculated using the following formula:

$$f = 1/2\pi * (kg/w)^{0.5}$$

wherein:
    f=frequency (Hz—cycles/second)
    k=stiffness of spring, (lbs/inch)
    w=weight (lbs)
    g=acceleration due to gravity (386 inches/second$^2$)

It should be noted that natural frequency of the shock attenuator 38 is independent of damping.

Referring now to FIG. 14c, shown are plots of frequency vs. transmissibility ratio for a range of shock attenuators 38 as may be incorporated into the swing speed analyzer 10. Transmissibility ratio may be described as the ratio of output excitation of a system (e.g., acceleration or displacement of a mass) to an input excitation (i.e., acceleration). A peak in the transmissibility ratio corresponds to a natural frequency of the mass. Although the natural frequency of the shock attenuator 38 is independent of damping, the amplification at the natural frequency is dependent upon the damping. Moreover, without damping, the magnification is infinite.

Most viscoelastomeric foam material such as foam rubber materials has a damping value of between 0.1 and 0.2. When a golf ball is struck by a golf club, a shock wave is generated which is composed of numerous high frequency vibrations. As can be seen in FIG. 6, the accelerations that are measured by the swing speed analyzer 10 undergo rapid oscillations in the output from the accelerometer when the golf ball is struck during a striking swing. Within the oscillations are many frequencies. It has been determined that the lowest frequency starts at about 125 Hz. However, this value of frequency varies depending on the type of the golf club and the construction of the club head of the golf club. In order to achieve over 50% attenuation (i.e., 0.5 transmissibility) at 125 Hz, the natural frequency of the shock attenuator 38 must be below about 50 Hz. Therefore, the shock attenuator 38 as described herein has been designed to have a natural frequency within the range of from about 25 Hz to about 40 Hz. For frequencies above about 125 Hz, the attenuation increases, as can be seen in FIG. 14c. The net result is that peak acceleration is attenuated from over 1000 g's to less that about 500 g's.

In addition, during the swinging of a golf club, there are many low frequency vibrations. The highest frequency vibrations correspond to bending that occurs in the shaft 58 of the golf club. More specifically, during a forward swing of the golf club, the golf shaft 58 bends which generates potential energy. Ideally, the potential energy that is stored in the shaft 58 as a result of the shaft 58 bending is released just before impact during a striking swing. Manufacturers of golf clubs have produced test data showing that the stiffest commercially available golf shaft 58 has a frequency of about 6 Hz. Therefore, during a golf swing, the highest frequency that may be measured by the accelerometer would be about 6 Hz.

In order to accurately measure all the low frequencies that occur during a golf swing, the shock attenuator 38 is ideally configured (e.g., sized and dimensioned) so as to minimize or eliminate the magnification of substantially all accelerations below about 6 Hz. Preferably, the shock attenuator 38 is configured to limit the magnification of all accelerations below about 6 Hz to less than about 6%. It can be seen from FIG. 14c that for a shock attenuator 38 having a natural frequency of 25 Hz, the magnification would be limited to about 1.06. Advantageously, the swing speed analyzer 10 of the present invention has been configured to account for any magnification of the low frequencies within the calibration formula which, as was earlier stated, converts the maximum acceleration just before impact into velocity in miles per hour (MPH).

In preferred embodiments of the swing speed analyzer 10, the shock attenuator 38 includes a shock attenuator 38 having a stiffness that is sufficient to attenuate an impact shock wave by more than 50% at 125 Hz. In more preferred embodiments of the swing speed analyzer 10, the stiffness of the shock attenuator 38 is sufficient to attenuate the impact shock wave from more than 1000 g's to less than about 500 g's, from more than 1000 g's to less than about 400 g's, and even more preferably from more than 1000 g's to less than about 300 g's. An especially preferred material for shock attenuation is COHRlastic R10460 Silicone Sponge Rubber with APSAI adhesive, manufactured by CHR Industries.

COHRlastic R10460 Silicone Sponge Rubber may be used in the present invention in thicknesses varying from less than bout 0.15 inch to more than about 0.25 inch. It has been determined that COHRlastic R10460 Silicone Sponge Rubber material, which may be interposed between the housing 44 and the shaft 58, provides the required stiffness and damping necessary to achieve the above-described attenuation and damping characteristics. In addition, COHRlastic R10460 Silicone Sponge Rubber material includes an adhesive layer on at least one side thereof to facilitate bonding to the housing 44.

Advantageously, the viscoelastomeric material (e.g., the COHRlastic R10460 Silicone Sponge Rubber material) is preferably configured such that when the material thickness is compressed by about 30%, a pressure is generated between the housing 44 and the golf shaft 58. The pressure generates a static friction force sufficient to substantially maintain the transverse axis of the housing 44 in general alignment with the plane of swing. As was previously mentioned, for the preferred embodiment, the viscoelastomeric layer of material may be bonded to the housing 44. The static friction force that is generated prevents relative motion (i.e., rotation) between the viscoelastomeric layer and the golf shaft 58. Such alignment is preferably maintained during swinging of the swinging implement, including during the period of impact of the swinging implement (i.e., golf club) with an object (i.e., golf ball). Furthermore, as can be seen in FIG. 13c and as will be explained below, the housing 44 has an aerodynamic profile which is configured to reduce aerodynamic drag. The aerodynamic shape or profile of the housing 44 necessitates that the housing 44 is maintained in general alignment with the plane of swing POS.

Referring to FIGS. 13a-13c, shown are cross-sectional shapes of the golf club shaft 58 at a hosel end thereof and cross-sectional shapes of the housing 44. The coefficient of aerodynamic drag for the circular shaped cross section of the shaft 58 is estimated to be about 1.2. FIG. 13b shows the cross-sectional shapes of the oval-shaped housing 44 which has a coefficient of drag of about 0.45. FIG. 13c is a preferred aerodynamic cross-sectional shape of the housing 44 having an airfoil shape with coefficient of drag of about 0.29. FIG. 13c also illustrates the preferred alignment thereof with a plane of swing of the golf club. It should be noted that the aerodynamic drag from the golf shaft 58 is insignificant compared to the aerodynamic drag generated by many large-style club heads that are used with driver type golf clubs. Even so, it is important that the aerodynamic drag produced by the housing 44 of the swing speed analyzer 10 does not increase the aerodynamic drag. In addition, the perception that a golf club produces relatively small amounts of aerodynamic drag is very important to many golfers. Therefore, a need exists for a housing 44 that produces no more aerodynamic drag than the aerodynamic drag that is produced by a corresponding length of shaft 58 which is covered by the housing 44.

Aerodynamic drag can be calculated from the following formula;

$$D = 0.5 \rho C_d V^2 A$$

wherein:
  D=drag force (lbs)
  $\rho$=air density (lbm/ft$^3$)
  $C_d$=drag coefficient
  V=velocity (feet per second)
  A=frontal area (width(feet)×length(feet))

From the above formula, it can be seen that aerodynamic drag increases in proportion to the square of the velocity. Therefore, during a swing of the swinging implement 12 such as the golf club, the majority of the aerodynamic drag is produced during the final portion of the swing which ideally occurs just prior to impact. At this point in the golf swing, the cocked wrists of the golfer are released and the potential energy in the bent shaft 58 is also released as the shaft 58 unflexes. Also, from the above formula, it can be seen that the aerodynamic drag is proportional to $C_d$×width. Referring now to FIGS. 13a, 13b, and 13c which compares the cross-section of a typical golf shaft 58 at the hosel end and two embodiment of the housing 44 shape (i.e., cross sectional shape), the comparative drag force can be calculated as follows:

round golf shaft (FIG. 13a)=$C_d$×width (diameter)
=1.20×0.34=0.44 oval-shaped housing (FIG. 13b)=0.45×0.80=0.36 airfoil shaped housing (FIG. 13c)=0.29×0.80=0.23

The drag coefficients for the swing speed analyzer 10 were calculated assuming an aspect ratio of 1.0 and an angle of attack of the housing 44 of ten degrees to account for possible misalignment of the housing 44 with respect to the plane of the swing. It can therefore be seen that the airfoil shaped housing 44 of the swing speed analyzer 10 limits the aerodynamic drag to no more than the aerodynamic drag which is generated by the corresponding length of shaft 58 that would otherwise be covered by the housing 44.

Referring still to FIGS. 4a, 4b, 5a and 5b, the swing speed analyzer 10 may preferably be mounted on the shaft 58 near the hosel adjacent the club head 60 although other locations of the swing speed analyzer 10 on the shaft 58 are contemplated. As can be seen, the housing 44 may be comprised of a fairing portion 46 pivotally connected to a clip portion 50 by a hinge 54. The housing 44 may also include a base portion 48 that may be partially coaxially disposable about the shaft 58 of the golf club 56. The clip portion 50 may include a latch portion 52 adapted to engage a side of the fairing housing 44 opposite that of the hinge 54.

The latch portion 52 is configured such that clip portion 50 may be selectively latched and unlatched from the fairing portion 46 so that the swing speed analyzer 10 may be easily attached to and detached from the shaft 58. In this manner, a user may interchangeably mount the swing speed analyzer 10 to a variety of golf clubs 56 as may be desirable during play of a round of golf. The shock attenuator 38 may be configured as a layer of viscoelastomeric material encasing a portion of the shaft 58 and captured between the base portion 48 and the shaft 58 and between the clip portion 50 and the shaft 58. The viscoelastomeric material may be formed as a pair of opposing elongate sections each covering an angle of about one-hundred-eighty degrees and configured to at least partially encase the shaft 58 when the clip portion 50 is secured to the fairing portion 46. Optionally, one of the sections of the pair may be permanently bonded or secured to an inside surface of the base portion 48 while the other one of the sections of the pair may be permanently bonded or secured to an inside surface of the clip portion 50 as is shown in FIGS. 4a and 5a.

However, it is contemplated that the viscoelastomeric material may be configured in any number of alternative configurations. For example, the viscoelastomeric material may be configured as a single piece having an elongate slit to allow the piece to be slid over the shaft 58 after which the housing 44 may be secured over the piece. The viscoelastomeric material is preferably sized and configured to provide a generally snug fit between the housing 44 and the shaft 58 such that the relative movement between the housing 44 and the shaft 58 is minimized or eliminated. Such a snug fit may improve the accuracy of tangential acceleration measurements by the dual-axis accelerometer 20 mounted on the electronic assembly 18 within the housing 44.

As can be seen in FIGS. 4a, 4b, 5a and 5b, the housing 44 defines an interior compartment. A circuit board 72 may extend across a width of the fairing portion 46 and may be affixed to opposing sides of the fairing portion 46. Mounted on the circuit board 72 may be the processor, the accelerometer, and the power source 28. A display device 24 may also be mounted within the housing 44. As can be seen in FIG. 2a, the housing 44 may include a display window 26 to allow the user to view swing parameters of just-completed swings.

As shown in FIGS. 2a, 4a, 4b, 5a and 5b, an on/off switch 30 may be included with the swing speed analyzer 10. The on/off switch 30 may be electrically connected to the electronic assembly 18 to allow for selective activation and deactivation of the supply of power from the power source 28 to the electronic assembly 18. The on/off switch 30 may be disposed on a side of the housing 44 and may protrude through the housing 44 wall such as on a side facing the grip end 14 such that the on/off switch 30 is visible by the user. As best seen in FIG. 2a, the on/off switch may be positioned on an upper end of the housing such that the user may easily activate and deactivate the supply of power to the swing speed analyzer 10. The on/off switch may be disposed adjacent the display window, as shown in FIG. 2a.

For configurations of the swing speed analyzer 10 wherein the display device 24 is included with the electronic assembly 18, (i.e., the display device 24 may be built-in or disposed within or upon the housing 44), the on/off switch 30 may be configured to cause the display device 24 to generate a visual indication as to whether the power source 28 is activated. For example, the display device 24 may display the notation "00 mph" to indicate that power is being supplied to the electronic assembly 18. By including such a feature, a user may prevent accidental discharge of the power source 28. As will be appreciated, there are an infinite number of configurations of the electronic assembly 18 to allow a user to determine whether or not the power source 28 is activated or deactivated. Furthermore, it is contemplated that the power source 28 may be automatically deactivated after occurrence of predetermined conditions, which may be pre-programmed into the processor 22.

For the case where the golf club 56 is the driver-type golf club 68 shown in FIGS. 6 and 6a, the club head 60 may include a top surface 70. The swing speed analyzer 10 may include a suction cup 66 that is configured to be detachably mountable on the top surface 70. For example, the suction cup 66 may be mounted to the top surface 70 using a releasable adhesive. Alternatively, the suction cup 66 may be mounted in a conventional manner using a manually created vacuum on an inside surface of the suction cup 66 forcing the suction cup 66 against the top surface 70 of the club head 60. Alternatively, it is contemplated that the suction cup 66 may be releasably mounted to the top surface 70 of the driver-type golf club 68 using a variety of alternative means including, but not limited to, Velcro or mechanical fasteners such as snaps or clips. In this manner, the swing speed analyzer 10 may be interchangeably mounted to a variety of driver-type golf clubs 68 such as may be used during play of a round of golf.

Referring to FIGS. 6 and 6a, the shock attenuator 38 is mounted on the suction cup 66 between the electronic assembly 18 and the suction cup 66. The shock attenuator 38 attenuates shock resulting from impact of the club head 60 or club face 62 with the object 40 such as the golf ball 64. Similar to the shock attenuator 38 for a shaft 58 mounted housing 44, the shock attenuator 38 of a club head 60 mounted housing 44 may be comprised of viscoelastomeric material such as foam. In this manner, at least a portion of the shock may be attenuated or isolated from the electronic assembly 18 and, hence, from the accelerometer 20 or accelerometers 20.

Referring still to FIGS. 6 and 6a, the swing speed analyzer 10 may be generally centered on the top surface 70 adjacent the club face 62 of the club head 60, although other locations of the swing speed analyzer 10 on the club head 60 are contemplated. As was earlier mentioned, the housing 44 assembly may be comprised of the housing 44, the shock attenuator 38 and the suction cup 66. As shown in FIG. 6a, the suction cup 66 may be generally concave shaped and configured to conform to at least a portion of the top surface 70. The housing 44 may have a generally truncated conical shape as is shown in FIGS. 6 and 6a although many other shapes for the housing 44 are contemplated. For example, the housing 44 may be cylindrically shaped or square-shaped. However, the truncated conical shape shown in FIGS. 6 and 6a is believed to be advantageous as it provides a generally aerodynamic shape in order to reduce air resistance of the housing 44 during swings of the swinging implement 12. In this regard, the housing 44 may be configured to have a generally low profile to further reduce air resistance.

As can be seen in FIG. 6a, the shock attenuator 38 is interposed or captured between the housing 44 and the suction cup 66. The electronic assembly 18 is disposed upon the shock attenuator 38 and the housing 44 is preferably mounted such that shock is attenuated prior to transmission to the circuit board 72 upon which the accelerometer 20 may be surface-mounted. However, included with the housing 44 or the housing 44 assembly may be a closeout cover 74 which may be attached to the shock attenuator 38 and/or the housing 44. A frame 76 may also be included with the housing 44 or with the housing 44 assembly and may be partially connected to the closeout cover 74, as is shown in FIG. 4a. The frame 76 may provide mounting support for the circuit board 72 and for the display device 24.

Referring still to FIGS. 6 and 6a, the processor 22 may be mounted to the circuit board 72, as may be the display device 24. The housing 44 may include an opening or display window 26 through which the user may view the swing parameter. The housing 44 may further include the on/off switch 30 that may extend to an exterior of the housing 44 on any side thereof, as is shown in FIG. 6a. As was described above, the on/off switch 30 may be configured to allow the user to activate or deactivate the swing speed analyzer 10. Likewise, the power indicator may be included with the electronic assembly 18 in the same manner as was described above.

Although the configuration of the club head-mounted swing speed analyzer 10 shown in FIGS. 6 and 6a is believed to be advantageous, it is noted that there are an infinite number of alternative configurations that may be utilized. Furthermore, the circuit board 72, housing 44, accelerometer 20 or pair of accelerometers 20, processor 22, display device 24, on/off switch 30, power indicator 118 and power source 28 may be arranged in an infinite number of alternative locations and orientations other than that the arrangement shown in FIGS. 6 and 6a.

In a further aspect, the swing speed analyzer 10 may include the feature of wireless transmission of radio signals to a remote device such as a remote receiver 90. In such a configuration, the swing speed analyzer 10 may be mounted on a variety of swinging implements 12 such as those described above in the same manner as that described above. The arrangement of components for the swing speed analyzer 10 having wireless capability is essentially the same as that described above for a non-wireless version of the swing speed analyzer 10. The swing speed analyzer 10 having wireless capability may include a transmitter electronic assembly 86 having an accelerometer 20 and a transmitter microcontroller 88. The accelerometer 20 may be the single-axis accelerometer 20 that is configured to measure centrifugal acceleration in the manner described above. Alternatively, the accelerometer 20 may be a dual-axis accelerometer 20 configured to measure tangential acceleration in the manner described above.

The transmitter electronic assembly 86 may be attached to the swinging implement 12 adjacent to the striking end 16. The transmitter electronic assembly 86 may include the accelerometer 20, which, as was earlier mentioned, is configured to generate the output signal(s) that is representative of the centrifugal acceleration or the tangential acceleration of the striking end 16. The housing 44 may be configured as shown in FIGS. 1-5b, or as shown in FIGS. 6 and 6a, or as shown in FIG. 12. However, there are an infinite number of alternative arrangements contemplated for the housing 44 wherein the swing speed analyzer 10 includes the feature of wireless transmission. Regardless of the specific arrangement, the housing 44 may be configured to house the accelerometer 20, a transmitter microcontroller 88, a display device 24, an on/off switch 30, a power source 28 and a power indicator 118. The power indicator 118 may be configured as a light-emitting diode 34 as shown in FIGS. 4b and 5b. The shock attenuator 38 may be included with the swing speed analyzer 10 and may be configured to attenuate shock loads from the swinging implement 12 to the transmitter electronic assembly 86 to protect the accelerometer 20 from high shock loads.

As shown in FIGS. 6 and 6a, the power indicator 118 is preferably electronically connected to the on/off switch 30 and/or the electronic assembly 18. The power indicator 118 is configured to indicate whether or not the supply of power has been activated. The power indicator 118 may preferably be configured as a lighting-emitting device and may be located on the side of the housing 44 adjacent the on/off switch 30 such that the user may visually determine whether the power source 28 has been activated by accessing whether the light is being emitted from the light-emitting device. However, as was earlier mentioned, the power indicator 118 may be altogether omitted from the electronic assembly 18.

The transmitter electronic assembly 86 may also include the transmitter microcontroller 88 which may be connected to the accelerometer 20. The transmitter microcontroller 88 may be configured to sample the output signal. If the accelerometer 20 is a single-axis accelerometer 20 for measuring centrifugal acceleration, the transmitter microcontroller 88 is configured to determine the swing parameter, such as tangential velocity, in the manner described above using the correlation factor. If the accelerometer 20 is a dual-axis accelerometer 20 for measuring tangential acceleration, the transmitter microcontroller 88 is configured to integrate the output signal over time to determine the swing parameter. In either case, the transmitter microcontroller 88 is configured to transmit a radio signal that is representative of the swing parameter.

The remote receiver 90 is in radio communication with the transmitter electronic assembly 86. The remote receiver 90 is configured to receive the radio signal from the transmitter microcontroller 88. The remote receiver 90 includes the display device 24 and is operative to generate a visual indication of the swing parameter on the display device 24. The remote receiver 90 may include a receiver electronic assembly 94 comprising a wireless receiver 96 and a receiver microcontroller 98. The wireless receiver 96 is configured to receive the radio signal. The receiver microcontroller 98 is connected to the wireless receiver 96 and is operative to process the radio signal and selectively display at least one of multiple swing parameters on the display device 24.

For the version of the swing speed analyzer 10 having the single-axis accelerometer such as is shown in FIGS. 4a and 4b, the receiver microcontroller 98 may be operative to display the centrifugal acceleration and/or the maximum tangential velocity. For the version of the swing speed analyzer 10 having the dual-axis accelerometer such as is shown in FIGS. 5a and 5b, the receiver microcontroller 98 may be operative to selectively display tangential acceleration and/or tangential velocity and/or duration of the forward swing and/or distance the striking end 16 travels during the forward swing. The remote receiver 90 may be operative to cause the display device 24 to plot tangential acceleration, plot tangential velocity and plot distance the striking end 16 travels during the forward swing.

A receiver power source 96 is connected to the receiver electronic assembly 94 and is configured to provide power thereto. One of the swing parameters that may be displayed by the display device 24 is centrifugal acceleration. Another one of the swing parameters that may be displayed by the display device 24 is tangential velocity. Tangential velocity may be determined in a manner similar to that described above wherein the transmitter microcontroller 88 is configured to sample the output signal and determine the centrifugal acceleration. The transmitter microcontroller 88 is configured to convert the centrifugal acceleration to a maximum tangential velocity using the correlation factor described above.

For configurations of the swing speed analyzer 10 including the feature of wireless transmission of radio signals, the electronic assembly 18 may include an antenna 32 as shown in FIGS. 4b and 5b. If included, the antenna 32 may extend from the transmitter microcontroller 88. The antenna 32 may be generally disposed within the housing 44 although it is contemplated that the antenna 32 may be integrated with the housing 44, extend along an exterior of the housing 44 or be disposed in a variety of other arrangements. As shown in FIGS. 4b and 5b, the antenna 32 is preferably arranged along a wall of the housing 44 such that it is protected from damage.

The transmitter electronic assembly 86 may include the antenna 32 disposed within the housing 44 and electrically connected to the transmitter microcontroller 88. The transmitter electronic assembly 86 may be configured to cause the antenna 32 to radiate the radio signal a predetermined distance away from the electronic assembly 18. Importantly, the remote receiver 90 may be disposed in spaced relation to the transmitter electronic assembly 86. The remote receiver 90 may be configured to be in radio communication with the transmitter microcontroller 88 such that the remote receiver 90 may receive the radio signal from the transmitter microcontroller 88 and cause the display device 24 to generate a visual indication of the swing parameter.

The remote receiver 90 may be configured to be attached to the user's body using a strap 92 that may be releasably worn by the user. The strap 92 may be configured to allow for releasable attachment of the remote receiver 90 to the user's wrist similar to the attachment of a wrist-watch, as is shown in FIG. 1. However, the remote receiver 90 may also include a clip (not shown) configured to allow for releasable attachment of the remote receiver 90 to an article worn by the user such as a belt or a pocket of an article of clothing. In this regard, it is contemplated that the clip may be releasably attached to any object that may be carried by the user, such as a golf bag or a golf cart. As can be seen, there are an infinite number of configurations for securing the remote receiver 90 to the user or to an article worn, carried, or used by the user. The remote receiver 90 may be configured as a portable computer (not shown) such as a personal computer more commonly referred to as a desktop personal computer. The remote receiver 90 may also be configured as a personal computer more commonly referred to as a laptop. The remote receiver 90 may also be configured as a hand-held personal computer more commonly referred to as a Palm Pilot. The remote receiver 90 may also be configured as a programmed dot-matrix type LCD display.

The remote receiver 90 may further include a receiver electronic assembly 94. The receiver electronic assembly 94 may be comprised of the wireless receiver 96, a receiver microcontroller 98 and a receiver power source 96. The receiver power source 96 may be configured to provide power to the receiver electronic assembly 94. The remote receiver 90 may be configured to receive the radio signal that is propagated from the antenna 32. The receiver microcontroller 98 may be connected to the remote receiver 90 and may be operative to process the radio signal and allow selective display of at least one of multiple types of swing parameters on the display device 24.

Regarding the display of swing parameters, one of the multiple swing parameters that may be displayed by the display device 24 of the receiver electronic assembly 94 may be tangential acceleration. Another one of the multiple swing parameters that may be displayed by the display device 24 may be tangential velocity. The display device 24 may be configured to generate a numerical display that is representative of the particular type of swing parameter. In the same manner as was described above for the microcontroller, the receiver microcontroller 98 may be configured to cause the display device 24 to display the notation as to whether the swing is a striking swing or a practice swing.

Referring to FIGS. 8-11, shown are plots of various types of swing parameters as may be measured by the swing speed analyzer 10. FIG. 8 is a plot of voltage output from the accelerometer configured to measure centrifugal acceleration vs. time for a practice swing and for a striking swing wherein the swinging implement 12 strikes the object resulting in a substantial increase in the voltage output from the accelerometer 20. As can be seen, the point P1 on the plot indicates the point during the swing wherein the swinging implement 12 strikes the object 40 resulting in a substantial increase in the voltage output from the accelerometer 20. Conversely, a point P2 on the plot of the practice swing indicates the point during the swing wherein the maximum tangential acceleration of the striking end 16 occurs.

Figure 7:
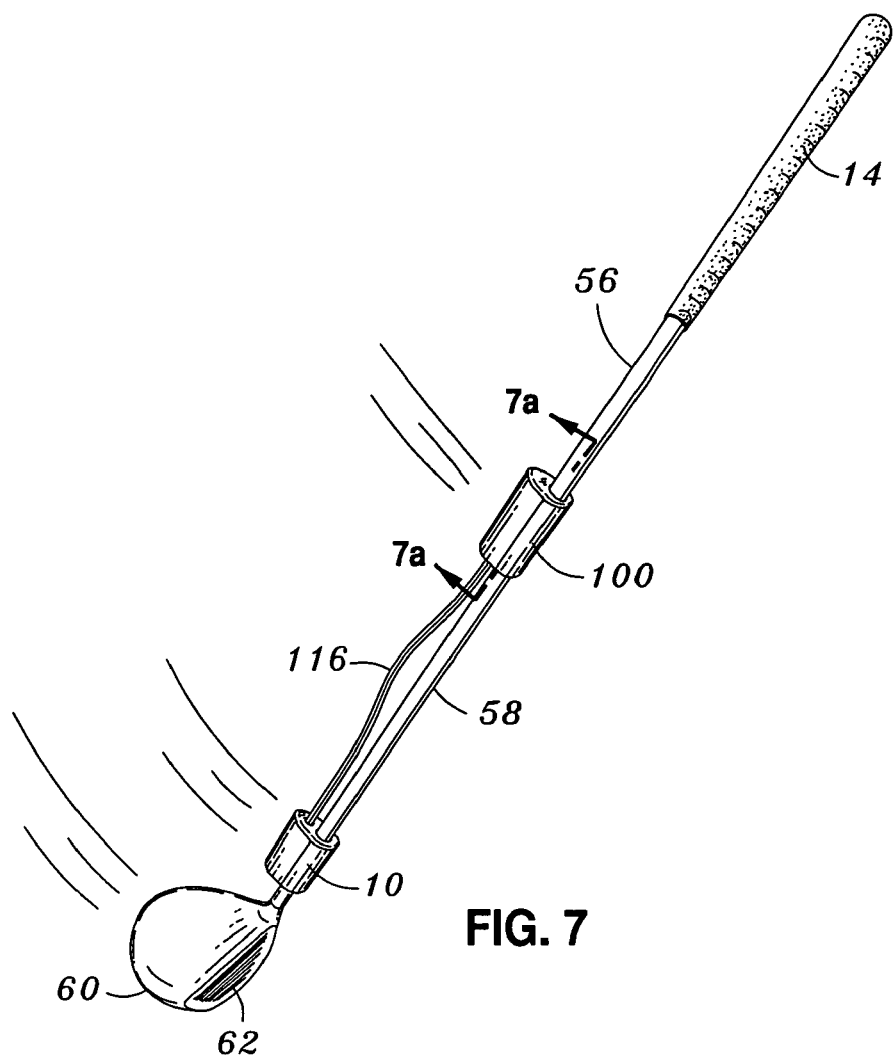
FIG. 7 is a perspective view of a shaft bending measurement device mounted on the shaft of the golf club above the swing speed analyzer in a further aspect of the invention.
Figure 9:
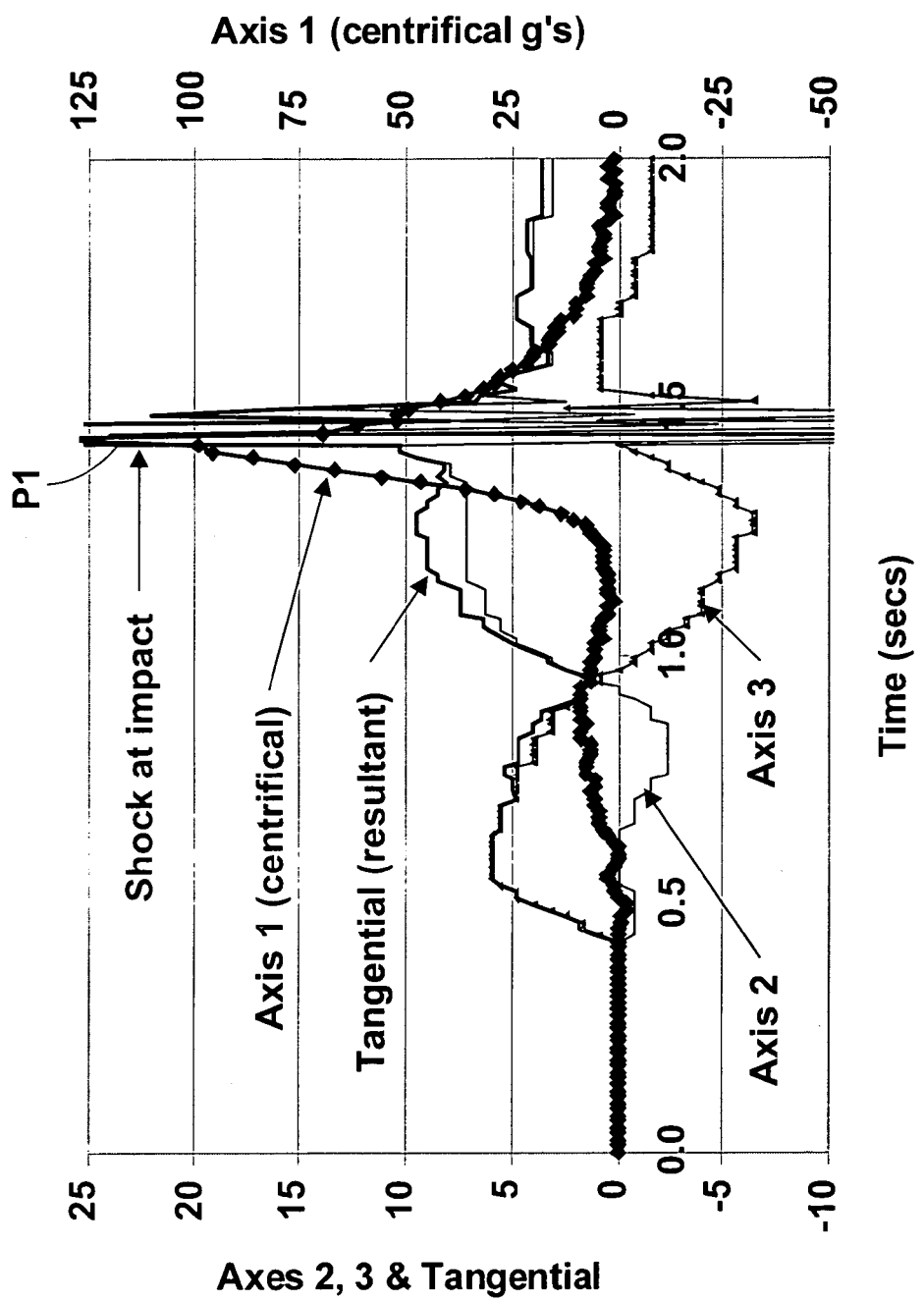
FIG. 9 is a plot of acceleration as measured by accelerometers respectively oriented to measure acceleration along the first, second and third axes of the reference coordinate system shown in FIG. 2 vs. tangential acceleration calculated as a resultant of accelerations respectively measured along the second and third axes vs. time during a swing of the golf club.

FIG. 9 is a plot of acceleration as measured by accelerometers 20 respectively oriented to measure acceleration along the first, second and third axes A1, A2, A3, of the reference coordinate system shown in FIG. 2 vs. tangential acceleration calculated as a resultant of accelerations respectively measured along the second and third axes A2, A3 vs. time during a swing of the golf club 56. FIG. 7 illustrates that a comparison of velocity obtained from calibration of the centrifugal acceleration and the velocity obtained by integrating the resultant tangential acceleration during the swing.

Figure 10:
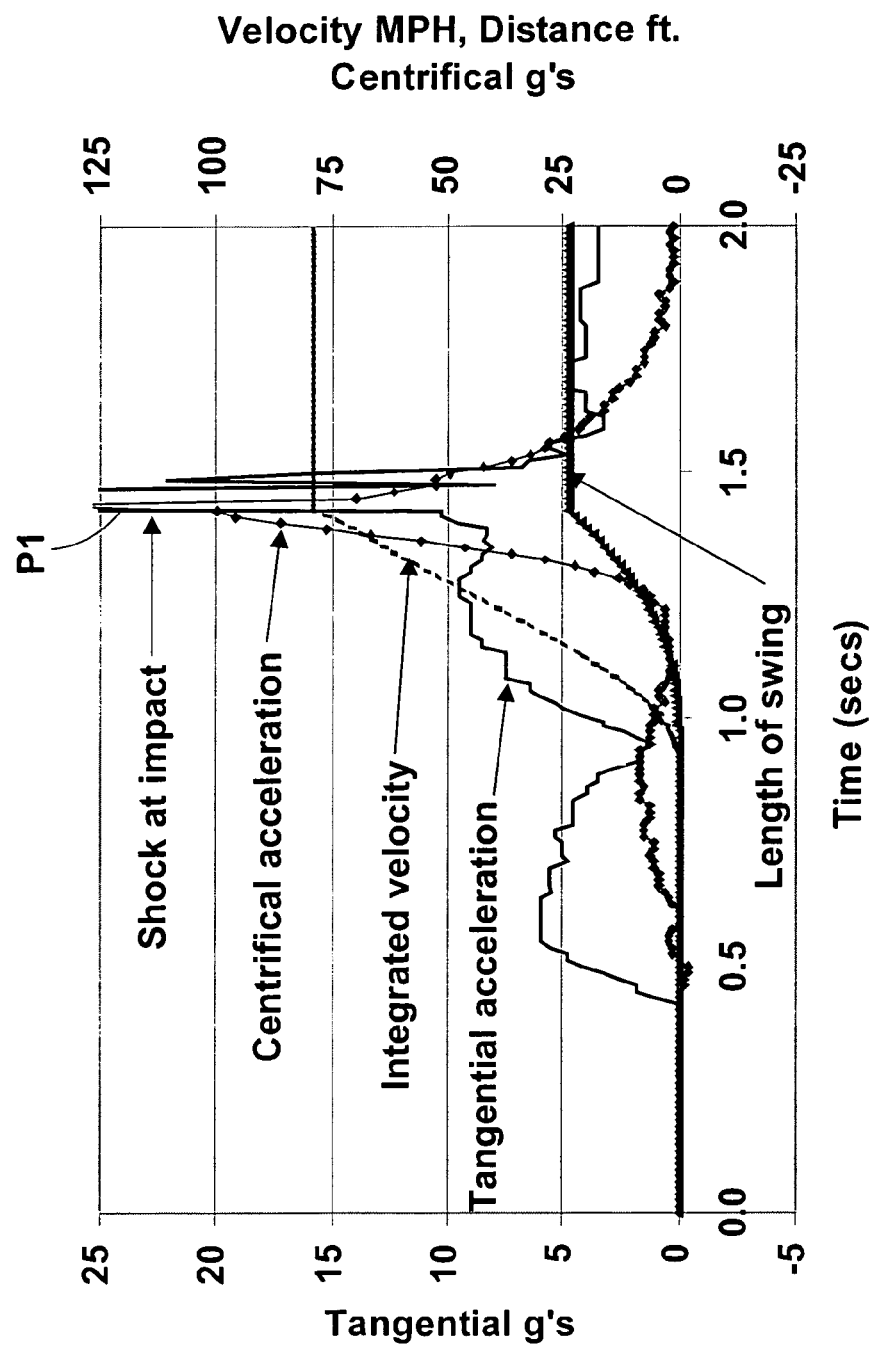
FIG. 10 is a plot of centrifugal acceleration vs. resultant tangential acceleration vs. velocity vs. distance of travel of the swinging implement vs. time during the forward swing of the swinging implement.
Figure 11:
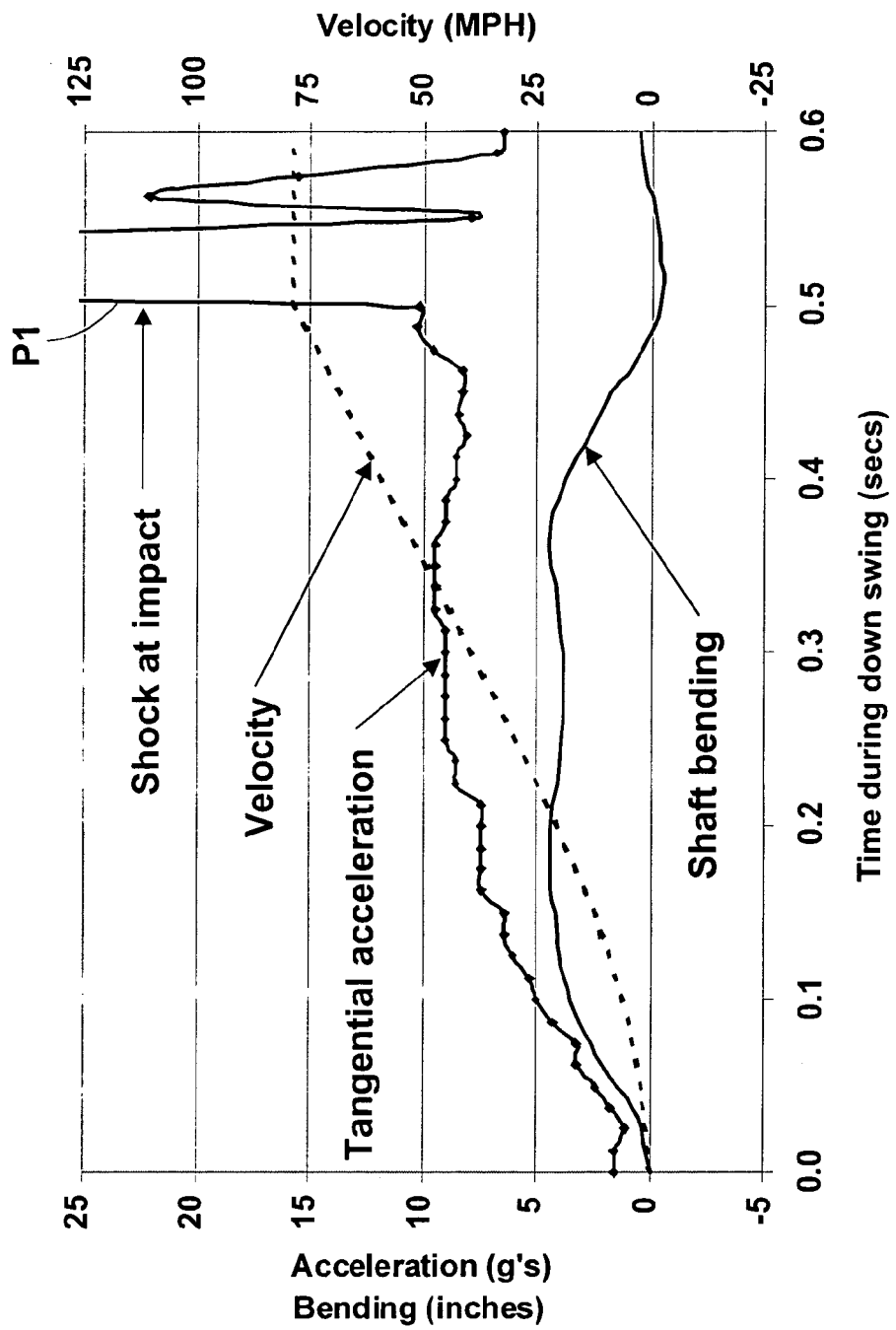
FIG. 11 is a plot of tangential acceleration vs. club head velocity calculated by integrating the tangential acceleration with respect to time vs. shaft bending vs. time during the forward swing of the swinging implement.

FIG. 10 is a plot of centrifugal acceleration vs. resultant tangential acceleration vs. velocity vs. distance of travel of the swinging implement 12 vs. time during the forward swing of the swinging implement 12. FIG. 11 is a plot of tangential acceleration vs. club head 60 velocity calculated by integrating the tangential acceleration with respect to time vs. shaft bending vs. time during the forward swing of the swinging implement 12.

During the forward swing of the swinging implement 12 such as the golf club 56, one of the objectives is to swing with a generally constant increase in resultant tangential acceleration. In addition, one of the objectives is to maximize tangential velocity at impact with the object 40. Furthermore, it is desirable during the forward swing that a maximum of the resultant tangential and a maximum of the tangential velocity occurs at impact of the striking end 16 (i.e., the club head 60) with the object 40 (i.e., the golf ball 64).

It is contemplated that the swing speed analyzer 10 may be configured such that swinging parameters of a user's swing may be compared to swinging parameters of a desirable swing such as a professional. For versions of the swing speed analyzer 10 having the dual-axis accelerometer 20 configured for measuring tangential acceleration, the receiver microcontroller 98 may be configured to be preprogrammed with exemplary swing parameters such as those of a professional golfer. The receiver microcontroller 98 may be operative to cause the display device 24 to plot the exemplary swing parameters and to plot a particular user's swing parameters for comparison therewith.

In addition, the receiver microcontroller 98 may be configured to store swing parameters and to cause the display device 24 to plot the stored swing parameters. In this manner, the user may review plots of better swings of the swinging implement 12 for comparison with plots of less desirable swings. Because most golfers occasionally make a very good swing of the golf club 56 resulting in an optimal flight path of the golf ball 64, by storing and plotting swing parameters, the golfer can analyze plots of various characteristics of the swing parameter of the great swing. In this manner, the golfer may learn to consistently swing the golf club 56 resulting in desirable characteristics of the swing parameters.

For example, a plot representative of club head 60 velocity of the professional golfer may be plotted on a graph along side a plot of the club head 60 velocity of the user of the swing speed analyzer 10. The plots may be superimposed upon each other allowing for direct comparison thereof. In this manner, the user may assess variations in velocity at different points during the swing. Likewise, plots of tangential acceleration may be superimposed upon each other for direct comparison.

The receiver microcontroller 98 may be configured to allow a user to input the type of golf club 56 for display as a notation on the display device 24 along with a display of a swing parameter of the same type of golf club 56. For example, during a round of golf, a golfer may use different golf clubs 56 ranging from the previously mentioned different types of driver-type golf club 68 to different types of iron-type golf clubs 56. The golfer may also use other specialty golf clubs 56 during the round of golf. Furthermore, each type of golf club 56 may be designated by a number. For example, driver-type golf clubs 68 may be numerically distinguished by designation as one-wood, two-wood, three-wood, etc., or by angular orientation or loft of the club face 62.

In like manner, iron-type golf clubs 56 may be numerically distinguished by designation as one-iron, two-iron, three-iron, etc., or by angular orientation or loft of the club face 62. Traditionally, the variation in numeric designation of the golf club 56 corresponds to variations in club head 60 geometry, such as loft of the club face 62, variations in length of the shaft 58 of the golf club 56, variations in mass of the club head 60, etc. As is well known in the game of golf, such variations affect the trajectory of the golf ball 64 as well as distance the golf ball 64 may travel when struck by a particular type of golf club 56.

Advantageously, for configurations of the swing speed analyzer 10 wherein the swinging implement 12 is the golf club 56, the receiver microcontroller 98 may be configured to allow the user to input the type of golf club 56 for display as a notation on the display device 24. The type of golf club 56 may then be displayed along with a display or plot of the corresponding swing parameters. In this manner, a golfer may compare any number of swing parameters for a particular type of golf club 56 during play.

For example, a golfer may determine an average velocity of the club head 60 for a given designation of driver-type golf club 68 by comparing velocity of the club head 60 for all striking swings of the same particular designation of the driver-type golf club 68 during a round of golf. The same golfer may also, for example, determine an average velocity of the club head 60 of a three-iron golf club 56 by comparing maximum velocity of the club head 60 during the same round of golf. By comparing and analyzing swings in this manner, the golfer may correct for deficiencies in the golfer's swing in order to improve the golfer's game.

Referring to FIG. 10, the data plotted may be used by an instructor in coaching students. Typically, the instructor may compare plots of tangential acceleration and velocity from a series of swings with historical data from the student's best swing or data from swings made by professionals. By studying the plots of a poor swing, the student may easily observe that the length of swing was reduced or the club head slowed down before impact with the golf ball. For a good swing, the instructor could relate the mechanics of the swing to the shape of the particular plot, which resulted in increased acceleration and velocity. By storing plots from a student's best swing, the data may be superimposed on the plots from each swing so that the student may develop a consistently excellent swing.

Figure 7A:
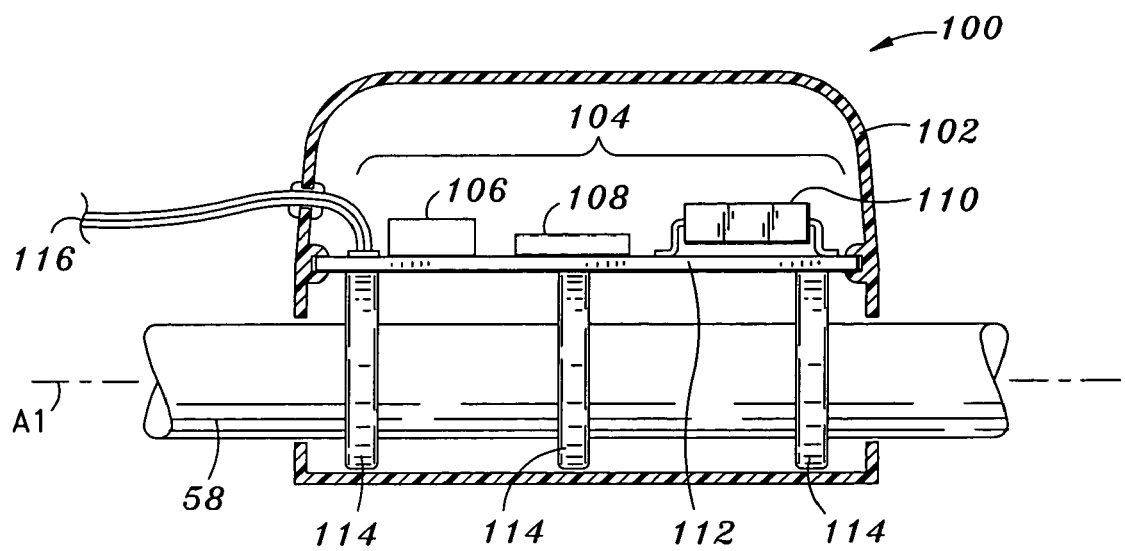
FIG. 7a is a cross-sectional view of the shaft bending measurement device taken along line 7a-7a of FIG. 7 and illustrating components of a device electronic assembly disposed within the housing.

Referring to FIGS. 7 and 7a, shown is a shaft bending measurement device 100 that may be mounted on the shaft 58 of the golf club 56. The shaft bending measurement device 100 may be mounted on the shaft 58 at the location of maximum shaft 58 bending which occurs approximately midpoint between the grip end 14 and the club head 60 of the golf club 56, as is shown in FIG. 7. Preferably, the shaft bending measurement device 100 may be mounted on the golf club 56 with the swing speed analyzer 10 also being mounted on the shaft 58.

The shaft bending measurement device 100 may include a device housing 102 and a device electronic assembly 104 disposed within the device housing 102, as shown in FIG. 7a. The device electronic assembly 104 may include a bending beam 112 with a strain gauge 108 disposed upon the bending beam 112. For wireless versions of the swing speed analyzer 10, the strain gauge 108 may be electrically connected to the transmitter electronic assembly 86 such that the output signal and the strain gauge 108 signal may be included in the radio signal for transmission to the remote receiver 90. The device housing 102 may have a generally aerodynamically shaped cross section similar to that described above for the housing 44 for the shaft-mounted swing speed analyzer 10.

In addition, the device housing 102 may be configured to be visually positionable in a manner such that the aerodynamic shape of the housing 44 trails behind the shaft 58 normal to the club face 62. In this regard, the device housing 102 is configured such that the bending beam 112 is angularly positionable substantially midway between an angle defined by a plane oriented substantially normal to the club face 62 and a plane oriented substantially parallel to the club face 62. By such angular positioning, the bending beam 112 may measure shaft 58 bending at the start of the forward swing (i.e., when the third axis A3 is typically oriented substantially parallel to the plane of swing POS) and also at a bottom of the forward swing (i.e., when the second axis A2 is typically oriented substantially parallel to the plane of swing POS). By angularly positioning the bending beam 112 substantially midway between the plane normal to the club face 62 and the plane parallel to the club face 62, the strain gauge 108 may measure a component of shaft 58 bending at any point during the forward swing, regardless of axial rotation of the shaft 58.

Regarding its composition, the shaft bending measurement device 100 may include the bending beam 112 disposed within the device housing 102. The bending beam 112 may be detachably mountable to the shaft 58 by any number of means such as with over-center clamps 114, as shown in FIG. 5a. However, the bending beam 112 may preferably be detachably mounted to the shaft 58 by any means providing a relatively rigid connection between the bending beam 112 and the shaft 58. In addition, the means of attaching the bending beam 112 to the shaft 58 may be configured to prevent scratching of the shaft 58 such as may occur with scratch-sensitive graphite shafts. Preferably, the bending beam 112 may be constrained to deflect to substantially the same extent as the shaft 58 during shaft 58 bending which typically occurs during swinging of the golf club 56. Importantly, the device housing 102 may be connected to the bending beam 112 so as not to substantially restrict bending of the bending beam 112.

In addition, the device housing 102 may be configured such that the bending beam 112 is angularly positionable substantially midway between a plane oriented normal to the club face 62 and a plane oriented parallel to the club face 62. The midway orientation of the bending beam 112 is preferred in order to allow for bending measurements at the start of a typical forward swing when the third axis A3 may be oriented generally parallel to the plane of swing POS while allowing for bending measurements when the second axis A2 is rotated such that the second axis A2 is oriented generally parallel to the plane of swing POS. The change in orientation of the second axis A2 during the forward swing is due to the approximate ninety degree axial rotation of the shaft 58 that naturally occurs during a typical forward swing, as was previously mentioned.

The device housing 102 may be secured to opposing ends of the bending beam 112 with the bending beam 112 being freely pivotably secured to the device housing 102 so as not to influence bending of the bending beam 112. Furthermore, it is contemplated that the device housing 102 may include a device fairing portion and a device clip portion similar to that described above for the swing speed analyzer 10. The device clip portion may be configured to circumscribe a portion of the shaft 58 in spaced relation thereto. In this manner, the device housing 102 may not contact any portion of the shaft 58 which may otherwise influence shaft 58 bending.

Disposed or mounted on the bending beam 112 may be a bridge circuit 110 and an amplifier 106. The strain gauge 108 may be disposed upon the bending beam 112 and may be oriented to measure bending of the bending beam 112 and to generate a strain gauge 108 signal representative of the shaft 58 bending. The strain gauge 108, bridge circuit 110 and amplifier 106 may be electrically connected to each other. As shown in FIG. 7a, the shaft bending measurement device 100 may be electrically connected to the swing speed analyzer 10, such as by an electric wire 116, such that the output signal and the strain gauge 108 signal may be included in the radio signal for transmission to the remote receiver 90. The receiver microcontroller 98 may be configured to cause the display device 24 to plot a velocity of the club head 60, plot shaft 58 bending during the forward swing of the golf club 56, and indicate on the plots the point at which the club face 62 impacts the golf ball 64 such that shaft 58 stiffness may be optimized for a particular user of the golf club 56.

Referring to FIG. 11, shown is a plot of tangential acceleration vs. club head velocity (calculated by integrating the tangential acceleration with respect to time) vs. shaft bending vs. time during the forward swing of the swinging implement. The data plotted may be used by a professional golf club fitter. Typically, the professional club fitter may save data from a series of a golfer's swings until there is sufficient data to determine the characteristics of the golfer's typical swing. Using this data, the professional golf club fitter may study the shape and magnitude of the plots of tangential acceleration, velocity and shaft 58 bending to determine the point in the golfer's swing at which maximum bending of the shaft 58 occurs as well as the point at which the potential energy in the shaft 58 is released. A shaft that is too flexible will typically result in lack of directional control of the golf ball because the club face may be "open" (angled outwardly) at impact. A shaft that is too stiff may result in lack of distance of travel of the golf ball. However, by attaching the portable swing speed analyzer 10 and the shaft bending measurement device 100 to various shafts, the professional golf club fitter can immediately show the golfer how selection of a shaft having the proper shaft stiffness improves accuracy and velocity of the club head at impact. The process may be repeated for each club in a set resulting in a complete set of matching clubs for the golfer with each club in the set having the same feel and which consistently produces longer and straighter shots.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A swing speed analyzer for mounting on a hand-held sporting implement having a shaft, comprising:
   a first accelerometer;
   a processor that uses an output from the first accelerometer to compute a swing speed;
   a housing containing at least the first accelerometer; and
   a layer of material adhesively bonded to the housing and interposed between the housing and the shaft and being sized and dimensioned to dampen an impact shock wave by more than 50% at 125 Hz;
   the housing being detachably mountable on the shaft.

2. The swing speed analyzer of claim 1, wherein the layer of material is sized and dimensioned to dampen the impact shock wave of more than 1000 g such that the shock wave is reduced to less than 500 g.

3. The swing speed analyzer of claim 1, wherein the layer of material is sized and dimensioned to dampen the impact shock wave of more than 1000 g such that the shock wave is reduced to less than 400 g.

4. The swing speed analyzer of claim 1, wherein the layer of material is sized and dimensioned to dampen the impact shock wave of more than 1000 g such that the shock wave is reduced to less than 300 g.

5. The swing speed analyzer of claim 1, wherein:
   during swinging of the hand-held sporting implement, frequencies below about 6 Hz are generated by the swinging of the sporting implement prior to occurrence of the impact shock wave;
   the layer of material is sized and dimensioned to limit magnification of accelerations as measured by the analyzer at all frequencies below 6 Hz by less than 6%.

6. The swing speed analyzer of claim 1, further comprising a visual display configured to graphically plot at least one of acceleration, velocity, time period and distance traveled during a swing.

7. The swing speed analyzer of claim 6, wherein the display comprises a liquid crystal display.

8. The swing speed analyzer of claim 1, further comprising a second accelerometer that provides a second input used by the processor to compute the swing speed, the processor being operative to integrate the resultant of first and second inputs over time to compute the swing speed.

9. The swing speed analyzer of claim 1, further comprising a visual display and wherein the processor is operative to distinguish between a practice swing and a striking swing, the processor being operative to cause the visual display to display a notation distinguishing the practice swing from the striking swing.

10. The swing speed analyzer of claim 1 further comprising a strain gauge for mounting on the shaft of the hand-held sporting implement and being oriented to measure bending of a portion of the shaft.

11. The swing speed analyzer of claim 1, wherein the material comprises viscoelastomeric material.

12. The swing speed analyzer of claim 11, wherein:
   the layer of material has a material thickness and a material stiffness;
   the swing speed analyzer is mounted on the shaft in general alignment with the plane of swing;
   the material stiffness being such that when the material thickness is compressed by about 30%, pressure is generated between the swing speed analyzer and the golf shaft;
   the pressure generating a static friction force sufficient to substantially maintain the alignment between the swing speed analyzer and the golf shaft during swinging of the golf club.

13. The swing speed analyzer of claim 1, wherein the housing is provided in at least one of an oval shape and an airfoil shape and having a coefficient of drag of less than approximately 0.37 and being configured to reduce aerodynamic drag of the shaft during a period of maximum velocity to no more than aerodynamic drag of a portion of the shaft which is covered by the housing when the swing speed analyzer is substantially aligned with a plane of swing of the shaft.

14. A hand-held sporting implement having a shaft coupled to a head, comprising:
   a swing speed analyzer mounted along the shaft, the swing speed analyzer including:
   a first accelerometer;
   a processor that uses an output from the first accelerometer to compute a swing speed;
   a housing containing at least the first accelerometer; and
   a layer of material adhesively bonded to the housing and interposed between the housing and the shaft and being sized and dimensioned to dampen an impact shock wave by more than 50% at 125 Hz;
   the housing being detachably mountable on the shaft;
   wherein the hand-held sporting implement is configured as at least one of a tennis racket, a baseball bat and a hockey stick.

* * * * *